(12) United States Patent
Inoue et al.

(10) Patent No.: US 8,648,807 B2
(45) Date of Patent: Feb. 11, 2014

(54) ILLUMINANCE SENSOR AND DISPLAY DEVICE INCLUDING SAME

(75) Inventors: Takahiro Inoue, Osaka (JP); Tadamasa Kimura, Osaka (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 252 days.

(21) Appl. No.: 13/277,525

(22) Filed: Oct. 20, 2011

(65) Prior Publication Data

US 2012/0113074 A1 May 10, 2012

(30) Foreign Application Priority Data

Nov. 10, 2010 (JP) ................................. 2010-251840

(51) Int. Cl.
G06F 3/033 (2013.01)

(52) U.S. Cl.
USPC ................ 345/165; 345/63; 345/690; 348/34

(58) Field of Classification Search
USPC ............. 345/38, 50, 63, 77, 87–104, 690, 12, 345/20, 34
See application file for complete search history.

(56) References Cited

U.S. PATENT DOCUMENTS

| | | | | |
|---|---|---|---|---|
| 5,070,754 A | * | 12/1991 | Adamson | 84/454 |
| 5,303,027 A | | 4/1994 | Kuderer et al. | |
| 5,693,934 A | * | 12/1997 | Hohmoto et al. | 250/214 A |
| 5,910,653 A | * | 6/1999 | Campo | 250/214 AL |
| 6,246,099 B1 | | 6/2001 | Pauchard et al. | |
| 6,741,282 B1 | * | 5/2004 | Morris | 348/308 |
| 7,683,955 B2 | | 3/2010 | Shimizu | |
| 2003/0160803 A1 | * | 8/2003 | Willis | 345/691 |
| 2003/0234762 A1 | * | 12/2003 | Nakatsuka et al. | 345/102 |
| 2007/0030231 A1 | * | 2/2007 | Lee et al. | 345/94 |
| 2007/0091052 A1 | * | 4/2007 | Tsuchi | 345/100 |
| 2007/0194217 A1 | * | 8/2007 | Takiba et al. | 250/226 |
| 2008/0129718 A1 | * | 6/2008 | Nishimura et al. | 345/205 |
| 2009/0267881 A1 | * | 10/2009 | Takaki | 345/89 |
| 2010/0079437 A1 | * | 4/2010 | Tonomura | 345/211 |
| 2011/0025654 A1 | * | 2/2011 | Nishimura et al. | 345/204 |
| 2011/0130981 A1 | * | 6/2011 | Chaji et al. | 702/58 |
| 2011/0205250 A1 | * | 8/2011 | Yoo et al. | 345/690 |

FOREIGN PATENT DOCUMENTS

| | | |
|---|---|---|
| JP | 5-215607 A | 8/1993 |
| JP | 2000-164914 A | 6/2000 |
| JP | 2007-73591 A | 3/2007 |
| JP | 2007-227551 A | 9/2007 |
| JP | 2008-124568 A | 5/2008 |
| JP | 2009-69023 A | 4/2009 |
| JP | 2010-153484 A | 7/2010 |
| JP | 2012-185043 A | 9/2012 |

* cited by examiner

Primary Examiner — Amare Mengistu
Assistant Examiner — Vinh Lam
(74) Attorney, Agent, or Firm — Birch, Stewart, Kolasch & Birch, LLP

(57) ABSTRACT

Disclosed are an illuminance sensor which has a spectral-response characteristic approximate to the spectral luminous efficacy and which has a low circuit complexity, and a display device including the illuminance sensor. The illuminance sensor includes (i) a current output circuit which, with use of a bitstream signal of a first analog-digital conversion circuit for carrying out an analog-digital conversion with respect to a first current flowing through a first light receiving element, outputs a current corresponding to the first current and (ii) a second analog-digital conversion circuit which receives a third current obtained by subtracting a current from a second current flowing through a second light receiving element and which thus carries out an analog-digital conversion with respect to the third current.

14 Claims, 11 Drawing Sheets

FIG. 7 (a)
FIG. 7 (b)
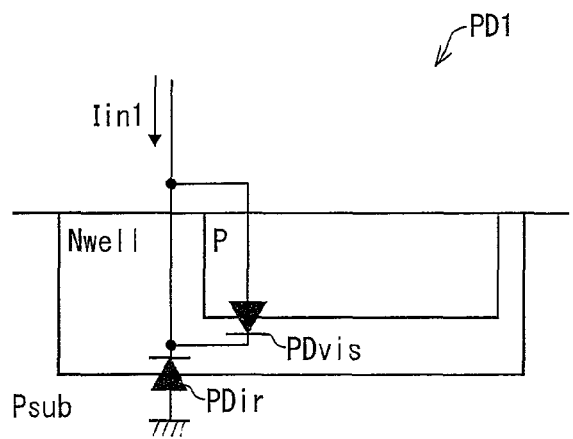
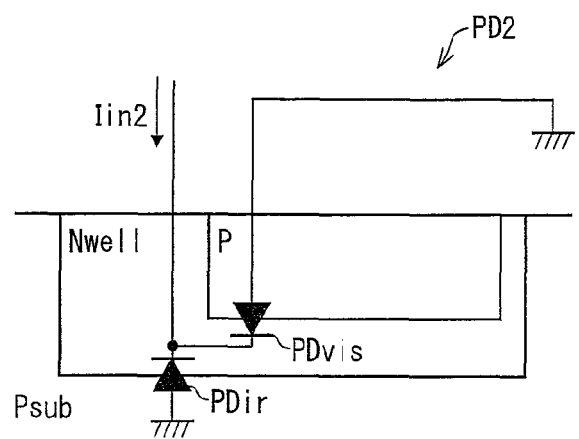
FIG. 8
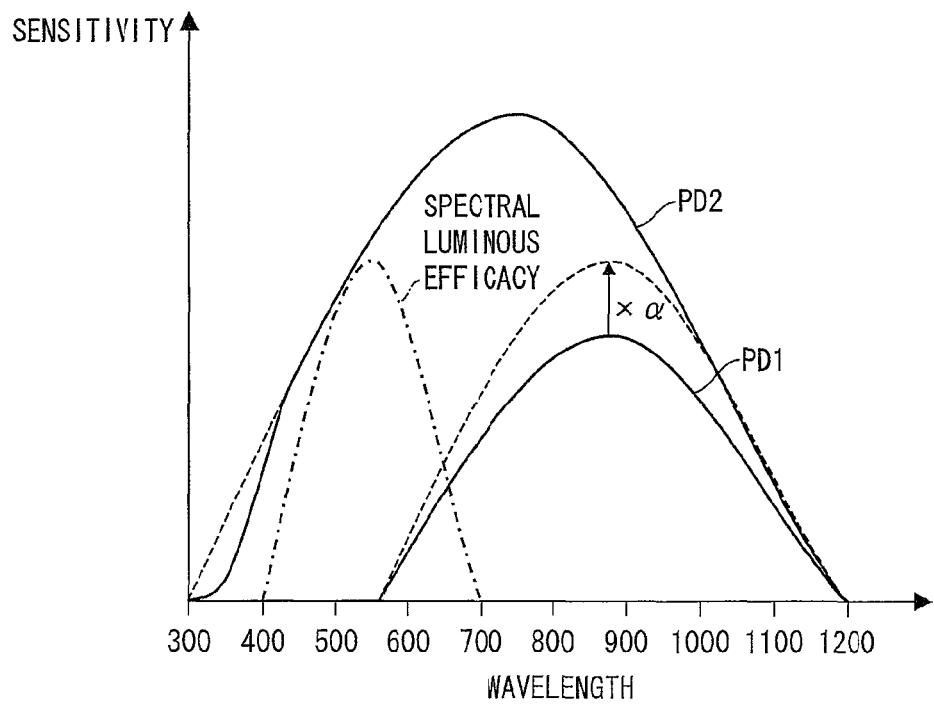

US 8,648,807 B2

ILLUMINANCE SENSOR AND DISPLAY DEVICE INCLUDING SAME

This Nonprovisional application claims priority under 35 U.S.C. §119(a) on Patent Application No. 2010-251840 filed in Japan on Nov. 10, 2010, the entire contents of which are hereby incorporated by reference.

TECHNICAL FIELD

The present invention relates to an illuminance sensor and a display device including the illuminance sensor.

BACKGROUND ART

A portable terminal such as a mobile telephone and a digital camera may include an illuminance sensor mounted in a liquid crystal panel to detect environmental brightness in order to control brightness (light emission amount) of a backlight device so that the brightness corresponds to the environmental brightness. This arrangement can reduce power consumption of the portable terminal and also improve visibility for the liquid crystal panel.

A typical illuminance sensor includes a silicon photodiode. Silicon photodiodes are widely used because they are compact and quick in response. A silicon photodiode, however, has a spectral-response characteristic which greatly differs from a spectral luminous efficacy for the human. Specifically, a silicon photodiode has a high sensitivity for light within an infrared region. A relation (photoelectric sensitivity) between an amount of received light and a photoelectric current depends on a wavelength of incident light, the wavelength having a relation (herein referred to as "spectral-response characteristic") with photoelectric sensitivity.

There has thus been an increasing demand for a sensor, for use as an illuminance sensor, which includes a silicon photodiode and nonetheless has a spectral-response characteristic approximate to the spectral luminous efficacy for the human.

A known system for achieving a spectral-response characteristic approximate to the spectral luminous efficacy for the human is a system involving subtraction for respective currents flowing through a plurality of photodiodes having different spectral-response characteristics. Patent Literatures 1 and 2, for example, each propose an illuminance sensor based on a system similar to the above.

FIG. 14 is a circuit diagram illustrating a main arrangement of the respective illuminance sensors proposed in Patent Literatures 1 and 2.

As illustrated in FIG. 14, the illuminance sensors of Patent Literatures 1 and 2 each include a current mirror circuit.

The illuminance sensors each include photodiodes PD1 and PD2. The photodiode PD1 has a current Iin1 flowing therethrough in correspondence with environmental brightness. The photodiode PD2 has a current Iin2 flowing therethrough in correspondence with environmental brightness.

The illuminance sensors each include transistors QP1 and QP2, which constitute a current mirror circuit. The transistor QP2 has a collector current, which is a current (Iin1×α, where α is a random coefficient) corresponding to the current Iin1 through the photodiode PD1.

The photodiodes PD1 and PD2 differ from each other in spectral-response characteristic for wavelengths of light. The illuminance sensors each achieve a spectral-response characteristic approximate to the spectral luminous efficacy by subtracting, from the current Iin2 through the photodiode PD2, the current (Iin1×α) corresponding to an amount of the current Iin1 through the photodiode PD1.

Further, there has been known a method for converting a sensor output into a digital value with use of an analog-digital conversion circuit. Converting, for example, an output current into a digital value as such facilitates processing on software by a CPU or a microcomputer. An integrating analog-digital conversion circuit, in particular, characteristically achieves a highly precise resolution with use of a simple configuration. An integrating analog-digital conversion circuit is thus suitable for use in a device, such as an illuminance sensor, which requires both a low speed and a highly precise resolution (approximately 16 bits).

FIG. 15 is a circuit diagram illustrating a main arrangement of an illuminance sensor including an analog-digital conversion circuit.

As illustrated in FIG. 15, the illuminance sensor includes photodiodes PD1 and PD2. The photodiode PD1 has a current Iin1 flowing therethrough in correspondence with environmental brightness. The photodiode PD2 has a current Iin2 flowing therethrough in correspondence with environmental brightness.

The current Iin1 is subjected to an analog-digital conversion by an analog-digital conversion circuit ADC 1 into a digital value ADCOUT1, whereas the current Iin2 is subjected to an analog-digital conversion by an analog-digital conversion circuit ADC2 into a digital value ADCOUT2.

The illuminance sensor achieves a spectral-response characteristic approximate to the spectral luminous efficacy by outputting a value (ADCOUT2−ADCOUT1×α) which is obtained by (i) multiplying the digital value ADCOUT1 by a (where α is a random coefficient) and (ii) subtracting, from the digital value ADCOUT2, a value (ADCOUT1×α) corresponding to the digital value ADCOUT1.

Other than an illuminance sensor for detecting environmental brightness as described above, a portable terminal such as a mobile telephone and a digital camera may include a proximity sensor mounted in a liquid crystal panel for detecting whether a detection object (for example, a face) is present. Such a portable terminal, for example, (i) detects whether a face is close to the portable terminal, and thus (ii) turns a backlight device off in a case where a face is close to the portable terminal (during a telephone call) and turns the backlight device on in a case where a face is not close to the portable terminal (during a manual operation). This arrangement can reduce power consumption of the portable terminal.

The following describes a proximity sensor with reference to FIGS. 16, 17(a), and 17(b). FIG. 16 is a view schematically illustrating an arrangement of a typical proximity sensor. FIG. 17(a) is a waveform chart for proximity/non-proximity, detected by the proximity sensor, of a detection object, specifically for a case in which proximity of a detection object is detected. FIG. 17(b) is a waveform chart for proximity/non-proximity, detected by the proximity sensor, of a detection object, specifically for a case in which non-proximity of a detection object is detected.

As illustrated in FIG. 16, the proximity sensor includes a photodiode (PD), a light-emitting diode (LED), and a control circuit.

The light-emitting diode is driven by the control circuit and thus emits a particular light. The photodiode for receiving light has a current flowing therethrough in correspondence with an amount of received light, the current being detected by the control circuit. The proximity sensor produces proximity data (Data1−Data2), which corresponds to a difference between (i) data Data1 obtained while the light-emitting diode is driven and (ii) data Data2 obtained while the light-emitting diode is not driven.

In the case where a detection object (for example, a face) is present, the detection object reflects a large amount of light while the light-emitting diode is driven (see FIG. 17(a)). This increases the current through the photodiode, and thus causes the proximity data (Data1−Data2) to exceed a threshold Datath of the control circuit. The proximity sensor determines proximity of a detection object as a result.

In the case where a detection object is not present, on the other hand, only a little light is reflected by a detection object while the light-emitting diode is driven (see FIG. 17(b)). This decreases the current through the photodiode, and thus causes the proximity data (Data1−Data2) not to exceed the threshold Datath of the control circuit. The proximity sensor determines non-proximity of a detection object as a result.

It is a known technique to, for accurate detection of whether a detection object is present, cause a light-emitting diode to emit light within an infrared region, the light being included in hardly any amount in light from a fluorescent lamp or light under a dim, outdoor environment.

In such a proximity sensor, the proximity data (Data1−Data2), which corresponds to a difference between (i) data Data1 obtained while the light-emitting diode is driven and (ii) data Data2 obtained while the light-emitting diode is not driven, is inversely proportional to the square of a detection distance. The proximity sensor can thus be used as a distance measuring sensor which calculates a detection distance from the proximity data.

CITATION LIST

Patent Literature 1
Japanese Patent Application Publication, Tokukai, No. 2007-73591 A (Publication Date: Mar. 22, 2007)
Patent Literature 2
Japanese Patent Application Publication, Tokukai, No. 2010-153484 A (Publication Date: Jul. 8, 2010)

SUMMARY OF INVENTION

Technical Problem

An illuminance sensor including a current mirror circuit as illustrated in FIG. 14, however, is problematically incapable of obtaining an accurate subtraction result due to a large error caused by the current mirror circuit.

Specifically, the current mirror circuit, which includes the two MOS transistors QP1 and QP2, may cause a large error due to, for example, a property variation and/or a difference in bias condition between the two transistors QP1 and QP2.

A MOS transistor has a drain current which is typically expressed by the following Formula (1):

$$Id = (1/2) \times \mu_0 \times Cox \times (W/L) \times (Vgs - Vth)^2 \times (1 - \lambda \times Vds) \quad (1).$$

In the above Formula (1), $\mu_0$ is an electron mobility, Cox is a gate oxide film capacity per unit area, W/L is processing measurements for a W length and an L length, Vgs is a gate-source voltage, Vth is a threshold voltage, $\lambda$ is a channel length modulation coefficient, and Vds is a drain-source voltage.

The above current mirror circuit has a difference in drain-source voltage Vds between the two transistors QP1 and QP2, and thus causes an error in its output current. Further, a MOS transistor typically causes an error of approximately several to 10 percent due to, for example, a variation in accuracy of processing for a W length and an L length and/or a variation in threshold voltage Vth.

As described above, a current mirror circuit including two MOS transistors QP1 and QP2 may cause a large error.

In addition, an illuminance sensor such as that illustrated in FIG. 14 involves a reverse bias voltage applied to the photodiodes PD1 and PD2, and thus generates a dark current. This further problematically prevents accurate illuminance measurement.

For a low illuminance, in particular, the photodiodes PD1 and PD2 each have a small photoelectric current, which in this case contains a large noise component due to a dark current. This prevents accurate illuminance measurement.

On the other hand, an illuminance sensor such as that illustrated in FIG. 15, which causes the respective currents Iin1 and Iin2 through the photodiodes PD1 and PD2 to be supplied to respective analog-digital conversion circuits and thus converted into respective digital values, prevents direct measurement of a current amount suitable for the spectral luminous efficacy. The above arrangement thus problematically prevents the spectral-response characteristic of the illuminance sensor from accurately approximating to the spectral luminous efficacy. This problem is particularly serious in a case where the illuminance sensor involves use of a light source having a large infrared component.

Furthermore, an illuminance sensor such as that illustrated in FIG. 15 requires both a multiplication circuit and a subtraction circuit, and thus problematically has a high circuit complexity.

The present invention has been accomplished in view of the above problems. It is an object of the present invention to provide (A) an illuminance sensor which (i) has a spectral-response characteristic approximate to the spectral luminous efficacy, which (ii) is nonetheless capable of accurate illuminance measurement, and which (iii) has a low circuit complexity, and (B) a display device including the illuminance sensor.

It is another object of the present invention to provide (A) an illuminance sensor capable of accurately measuring even a low illuminance and (B) a display device including the illuminance sensor.

Solution to Problem

In order to solve the above problems, an illuminance sensor of the present invention is an illuminance sensor including a first light receiving element and a second light receiving element which are different from each other in spectral-response characteristic, the illuminance sensor including: (A) a first analog-digital conversion circuit for carrying out an analog-digital conversion with respect to a first current which flows through the first light receiving element in correspondence with an intensity of light received by the first light receiving element, the first analog-digital conversion circuit including an integrating analog-digital conversion circuit which includes: an integrating circuit that includes an integrating capacitor for integrating an electric charge corresponding to the first current inputted to the integrating circuit and that outputs a voltage corresponding to a result of the integration by the integrating capacitor; a comparing circuit that compares (i) a magnitude of the voltage outputted by the integrating circuit with (ii) a magnitude of a reference voltage so as to output a result of the comparison as a binary pulse signal; an output circuit for receiving the pulse signal outputted by the comparing circuit, the output circuit (i) including a counter for counting a number of active pulses included in the pulse signal received and (ii) outputting, as an analog-digital conversion value for the first current, a result of the count by the counter; and a discharging circuit that receives from the output circuit a time series stream of the active pulses as a bitstream signal and that outputs a current during an active pulse period of the bitstream signal so as to discharge the integrating capacitor; (B) a current output circuit for receiving the bitstream signal from the output circuit and outputting a current during the active pulse period of the bitstream signal; and (C) a second analog-digital conversion circuit including an integrating analog-digital conversion circuit for carrying out an analog-digital conversion with respect to a third current obtained by subtracting the current outputted by the current output circuit from a second current which flows through the second light receiving element in correspondence with an intensity of light received by the second light receiving element.

According to the above arrangement, the active pulse period has a total length corresponding to a magnitude of the first current. The output pulse current of the current output circuit is integrated, that is, averaged, by the integrating circuit, so that the first current can be multiplied by a predetermined coefficient. The current obtained by multiplying the first current by the predetermined coefficient is subtracted from the second current, and the resulting current is subjected to an analog-digital conversion. This arrangement allows the spectral-response characteristic of the illuminance sensor to approximate to the spectral luminous efficacy accurately.

The above arrangement also allows accurate illuminance measurement without use of a current mirror circuit.

The above arrangement, which does not require a multiplication circuit and a subtraction circuit, further allows a low circuit complexity.

The above arrangement consequently provides an illuminance sensor which (i) has a spectral-response characteristic approximate to the spectral luminous efficacy, which (ii) is nonetheless capable of accurate illuminance measurement, and which (iii) has a low circuit complexity.

A display device of the present invention includes: a display panel for displaying an image; a backlight device for irradiating the display panel; a backlight control circuit for controlling luminance of the backlight device; and the illuminance sensor according to any one of claims 1 to 11, the backlight control circuit controlling the luminance of the backlight device on a basis of a digital value outputted by the second analog-digital conversion circuit.

The above arrangement allows the brightness of the backlight device to be adjusted in correspondence with the intensity of environmental light, and can thus reduce power consumption of the display device.

The above arrangement further allows the spectral-response characteristic of the illuminance sensor included in the display device to approximate to the spectral luminous efficacy accurately, and can consequently improve visibility for the display device.

Advantageous Effects of Invention

An illuminance sensor of the present invention is an illuminance sensor including a first light receiving element and a second light receiving element which are different from each other in spectral-response characteristic, the illuminance sensor including: (A) a first analog-digital conversion circuit for carrying out an analog-digital conversion with respect to a first current which flows through the first light receiving element in correspondence with an intensity of light received by the first light receiving element, the first analog-digital conversion circuit including an integrating analog-digital conversion circuit which includes: an integrating circuit that includes an integrating capacitor for integrating an electric charge corresponding to the first current inputted to the integrating circuit; a comparing circuit that compares (i) a magnitude of the voltage outputted by the integrating circuit with (ii) a magnitude of a reference voltage so as to output a result of the comparison as a binary pulse signal; an output circuit for receiving the pulse signal outputted by the comparing circuit, the output circuit (i) including a counter for counting a number of active pulses included in the pulse signal received and (ii) outputting, as an analog-digital conversion value for the first current, a result of the count by the counter; and a discharging circuit that receives from the output circuit a time series stream of the active pulses as a bitstream signal and that outputs a current during an active pulse period of the bitstream signal so as to discharge the integrating capacitor; (B) a current output circuit for receiving the bitstream signal from the output circuit and outputting a current during the active pulse period of the bitstream signal; and (C) a second analog-digital conversion circuit including an integrating analog-digital conversion circuit for carrying out an analog-digital conversion with respect to a third current obtained by subtracting the current outputted by the current output circuit from a second current which flows through the second light receiving element in correspondence with an intensity of light received by the second light receiving element.

The above arrangement provides (A) an illuminance sensor which (i) has a spectral-response characteristic approximate to the spectral luminous efficacy, which (ii) is nonetheless capable of accurate illuminance measurement, and which (iii) has a low circuit complexity, and (B) a display device including the illuminance sensor.

BRIEF DESCRIPTION OF DRAWINGS

FIG. 7(a) is a circuit diagram illustrating respective structures of the photodiodes PD1 and PD2 (specifically, a structure of the photodiode PD1) having the respective spectral-response characteristics illustrated in FIG. 5, the photodiodes PD1 and PD2 being included in the illuminance sensor of the embodiment of the present invention.

FIG. 7(b) is a circuit diagram illustrating respective structures of the photodiodes PD1 and PD2 (specifically, a structure of the photodiode PD2) having the respective spectral-response characteristics illustrated in FIG. 5, the photodiodes PD1 and PD2 being included in the illuminance sensor of the embodiment of the present invention.

FIG. 8 is a graph illustrating another example of spectral-response characteristics of photodiodes PD1 and PD2 in the illuminance sensor of the embodiment of the present invention.

DESCRIPTION OF EMBODIMENTS

Embodiments of the present invention will be described below in detail.

Embodiment 1

The present embodiment is an example of a liquid crystal display device in which an illuminance sensor is mounted.

(Overall Arrangement of Liquid Crystal Display Device)

Figure 12:
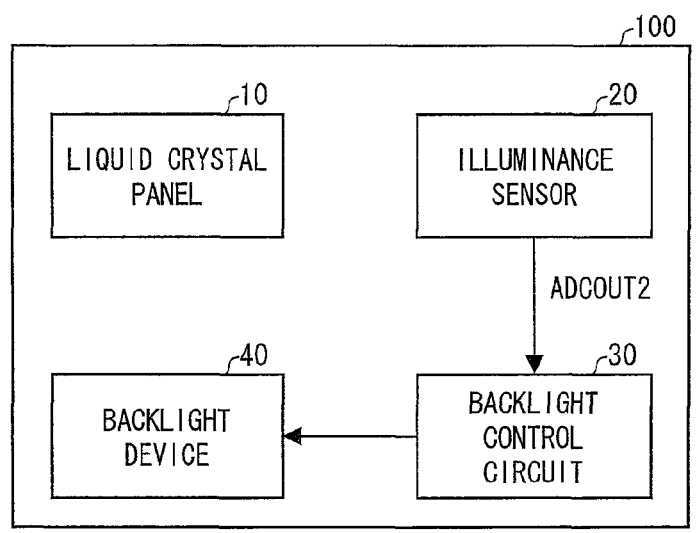
FIG. 12 is a block diagram illustrating an overall arrangement of a liquid crystal display device of Embodiment 1 of the present invention.

The following first describes, with reference to FIG. 12, a schematic arrangement of the liquid crystal display device of the present embodiment. FIG. 12 is a block diagram schematically illustrating the arrangement of the liquid crystal display device of the present embodiment.

As illustrated in FIG. 12, the liquid crystal display device 100 includes a liquid crystal panel 10, an illuminance sensor 20, a backlight control circuit 30, and a backlight device 40.

The illuminance sensor 20 receives environmental light so as to measure brightness of the environment, and supplies as a measurement result a digital value ADCOUT2 to the backlight control circuit 30. The backlight control circuit 30, on the basis of the digital value ADCOUT2, controls brightness (light emission amount) of the backlight device 40 so that the brightness corresponds to the environmental brightness.

The above arrangement, which controls the brightness of the backlight device 40 so that the brightness corresponds to the environmental light, can reduce power consumption of the liquid crystal display device 100.

(Arrangement of Illuminance Sensor)

Figure 1:
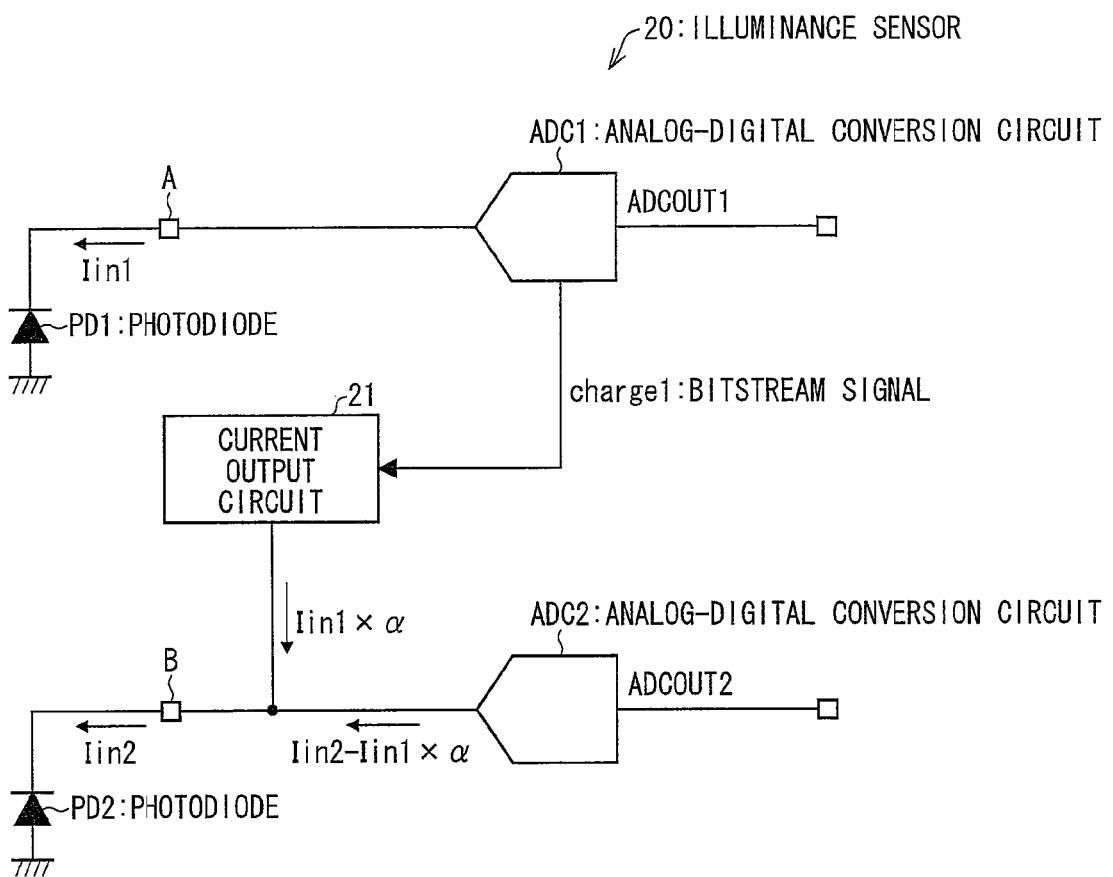
FIG. 1 is a circuit diagram illustrating an arrangement of an illuminance sensor of an embodiment of the present invention.

The following describes, with reference to FIG. 1, an arrangement of the illuminance sensor of the present embodiment. FIG. 1 is a circuit diagram illustrating the arrangement of the illuminance sensor of the present embodiment.

As illustrated in FIG. 1, the illuminance sensor 20 includes photodiodes PD1 and PD2, analog-digital conversion circuits ADC1 and ADC2, and a current output circuit 21.

The photodiodes PD1 and PD2 each have an anode connected with a ground. The photodiode (first light receiving element) PD1 has a cathode connected with the analog-digital conversion circuit (first analog-digital conversion circuit) ADC1 at a node A. The photodiode (second light receiving element) PD2 has a cathode connected, at a node B, with a point connecting the analog-digital conversion circuit (second analog-digital conversion circuit) ADC2 with the current output circuit 21.

The photodiodes PD1 and PD2 differ from each other in spectral-response characteristic for light wavelengths. The photodiode PD1 has a current Iin1 (first current) flowing therethrough in response to an amount of reception of light within an infrared region, whereas the photodiode PD2 has a current Iin2 (second current) flowing therethrough in response to an amount of reception of light within a range from a visible wavelength range to the infrared wavelength range.

The analog-digital conversion circuit ADC1 receives the current Iin1 flowing through the photodiode PD1 and carries out an analog-digital conversion with respect to the current Iin1 so as to output a digital value ADCOUT1.

The current output circuit 21 receives a bitstream signal charge1 from the analog-digital conversion circuit ADC1 and outputs a current Iin1×α, which corresponds to the current Iin1 flowing through the photodiode PD1, Note that α is a random coefficient and that adjusting a allows the spectral-response characteristic of the illuminance sensor 20 to approximate to a spectral luminous efficacy for the human.

The analog-digital conversion circuit ADC2 (i) receives a current (Iin2−Iin1×α) obtained by subtracting the current Iin1×α, which corresponds to the current Iin1 flowing through the photodiode PD1, from the current Iin2 flowing through the photodiode PD2 and (ii) carries out an analog-digital conversion with respect to the current (Iin2−Iin1×α) so as to output a digital value ADCOUT2.

The above arrangement causes the analog-digital conversion circuit ADC2 to carry out an analog-digital conversion with respect to the current (Iin2−Iin1×α) and supply, as a conversion result, the digital value ADCOUT2 to the backlight control circuit 30. The arrangement consequently allows the spectral-response characteristic of the illuminance sensor 20 to approximate to the spectral luminous efficacy accurately. The arrangement further makes it possible to easily process the digital value ADCOUT2 on software under control by, for example, a CPU or MPU contained in the backlight control circuit 30.

(Arrangement of Analog-Digital Conversion Circuit)

Figure 2:
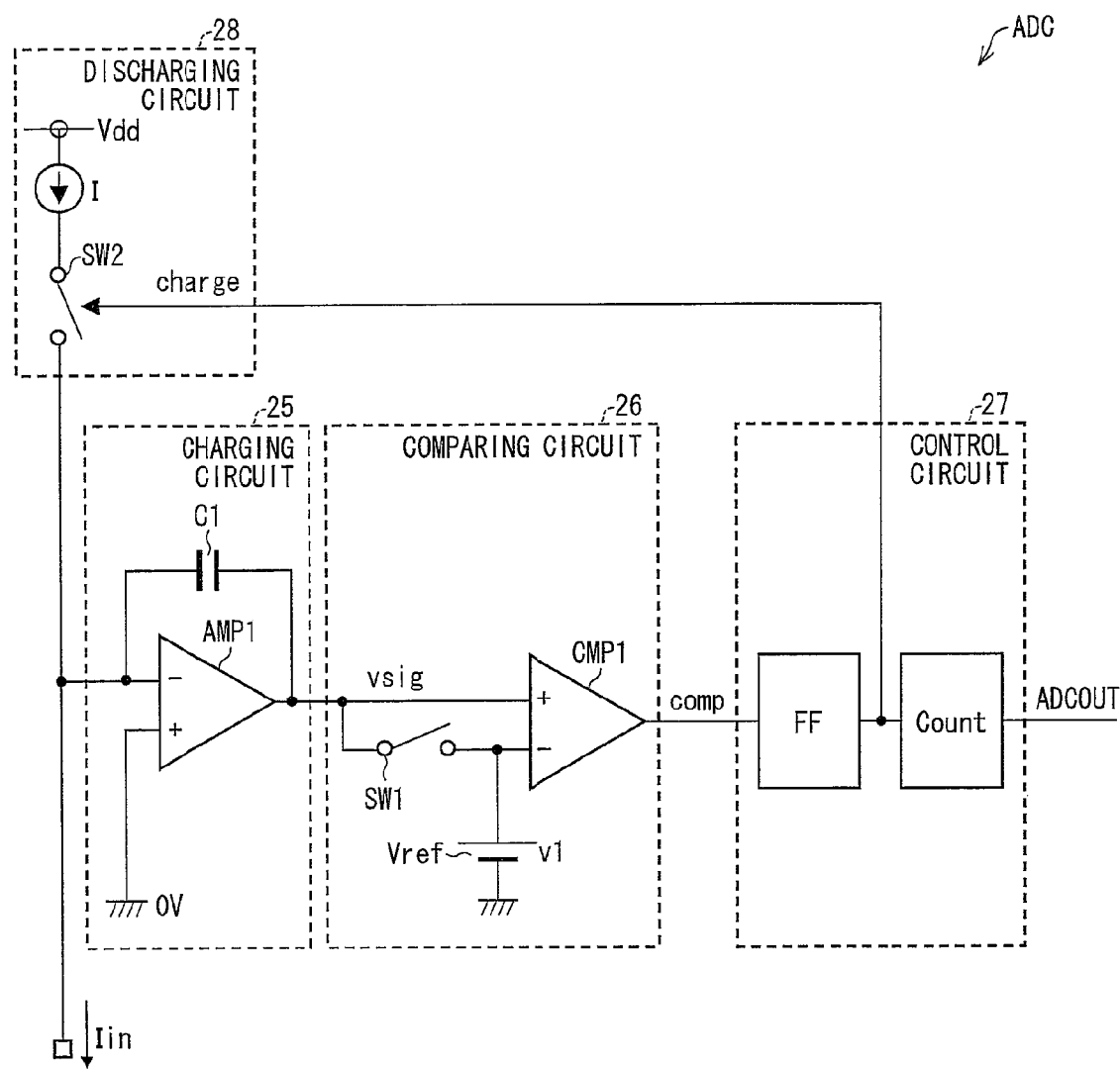
FIG. 2 is a circuit diagram illustrating an arrangement of an analog-digital conversion circuit in the illuminance sensor of the embodiment of the present invention.
Figure 3:
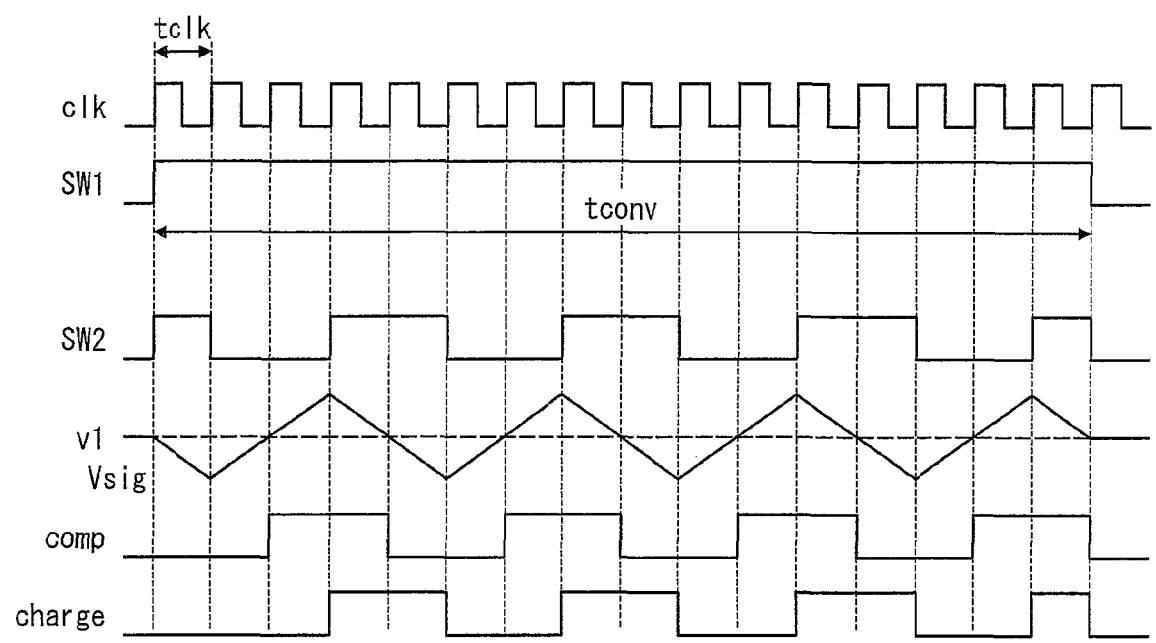
FIG. 3 is a waveform chart illustrating operation of the analog-digital conversion circuit in the illuminance sensor of the embodiment of the present invention.

The following describes, with reference to FIGS. 2 and 3, the analog-digital conversion circuits ADC1 and ADC2 of the present embodiment. FIG. 2 is a circuit diagram illustrating an arrangement of the analog-digital conversion circuits ADC1 and ADC2 of the present embodiment. FIG. 3 is a waveform chart illustrating operation of the analog-digital conversion circuits ADC1 and ADC2 of the present embodiment.

In the present embodiment, the analog-digital conversion circuits ADC1 and ADC2 are identical in configuration to each other. The description below thus uses the term "analog-digital conversion circuit ADC" in collectively referring to them without discriminating one from the other.

As illustrated in FIG. 2, the analog-digital conversion circuit ADC includes: a charging circuit (integrating circuit) 25 for storing an electric charge; a discharging circuit 28 for releasing an electric charge; a comparing circuit 26 for comparing a magnitude of an output voltage vsig of the charging circuit 25 with a magnitude of a reference voltage v1; and a control circuit (output circuit) 27 for outputting a digital value ADCOUT on the basis of an output signal comp, that is, a result of the comparison by the comparing circuit 26.

The comparing circuit 26 includes a comparator CMP1 and a switch SW1. The switch SW1 is turned on/off and thus determines a data conversion period, during which a current Iin inputted is converted into a digital value ADCOUT. When the switch SW1 is turned on, a power supply Vref is connected with the charging circuit 25, so that the charging circuit 25 is charged. When the switch SW1 is turned off, the comparator CMP1 compares the output voltage vsig of the charging circuit 25 with the reference voltage v1, and thus supplies the control circuit 27 with, as a result of the comparison, an output signal comp, which is a binary pulse signal either at a "high" level or at a "low" level. The current Iin inputted is converted into a digital value ADCOUT while the switch SW1 is off.

The control circuit 27 includes a flip-flop FF and a counter Count. The flip-flop FF latches the output signal comp of the comparing circuit 26, and supplies a bitstream signal charge, as a result of the latch, to the discharging circuit 28 and the counter Count. The counter Count counts the number of low level instances (the number of discharges) for the bitstream signal charge received by the control circuit 27, that is, the counter Count counts the number of active pulses, so as to output a result of the count as a digital value ADCOUT, which is a value (i) obtained by an analog-digital conversion and (ii) corresponding to the current Iin inputted.

The discharging circuit 28 includes a switch SW2, which is turned on/off on the basis of the bitstream signal charge.

The charging circuit 25 includes an amplifier AMP1 and a capacitor (integrating capacitor) C1, which together constitute an integrating circuit. When the switch SW2 of the discharging circuit 28 is turned on, the discharging circuit 28 causes the capacitor C1 of the charging circuit 25 to store an electric charge. When the switch SW2 is turned off, the electric charge in the capacitor C1 is released in correspondence with the current Iin inputted.

The following describes, with reference to FIG. 3, operation of the analog-digital conversion circuit ADC in detail.

The switch SW1, upon receipt of a high-level signal, is turned off, which starts conversion of the inputted current Iin into a digital value ADCOUT.

First, the switch SW2, upon receipt of a high-level signal, is turned off, which causes the electric charge stored in the capacitor C1 of the charging circuit 25 to be released in correspondence with the current Iin (precharging operation). This lowers the output voltage vsig of the charging circuit 25. The output voltage vsig of the charging circuit 25 was initially set at a level identical to a level of the reference voltage v1, and is consequently lower than the reference voltage v1 during this period.

Next, the switch SW2, upon receipt of a low-level signal, is turned on, and the discharging circuit 28 causes the capacitor C1 of the charging circuit 25 to store an electric charge. This raises the output voltage vsig of the charging circuit 25. The output voltage vsig of the charging circuit 25 becomes larger than the reference voltage v1 at a point in time. The output voltage vsig of the charging circuit 25 and the reference voltage v1 are compared by the comparator CMP1. When the output voltage vsig of the charging circuit 25 exceeds the reference voltage v1, the comparator CMP1 outputs a high-level output signal comp.

The flip-flop FF of the control circuit 27, upon receipt of the high-level output signal comp, latches the output signal comp, and outputs a high-level bitstream signal charge at a subsequent rise of a clock signal clk.

The switch SW2, upon receipt of a high-level bitstream signal charge, is turned off, which causes the electric charge stored in the capacitor C1 of the charging circuit 25 to be released. This lowers the output voltage vsig of the charging circuit 25. The output voltage vsig of the charging circuit 25 becomes lower than the reference voltage v1 at a point in time. The output voltage vsig of the charging circuit 25 and the reference voltage v1 are compared by the comparator CMP1. When the output voltage vsig of the charging circuit 25 is lower than the reference voltage v1, the comparator CMP1 outputs a low-level output signal comp as an active pulse which indicates that an output of the comparing circuit 26 is at an active level. The active pulse may be set to either a low-level output signal or a high-level output signal, and can thus be selected as appropriate depending on an operation logic of the circuitry.

The flip-flop FF of the control circuit 27, upon receipt of the low-level output signal comp, latches the output signal comp so that the control circuit 27 receives the output signal comp. The flip-flop FF outputs a low-level bitstream signal charge at a subsequent rise of the clock signal clk.

The switch SW2, upon receipt of the low-level bitstream signal charge, is turned on. The bitstream signal charge is a time series stream of low-level signals (active pulses), and has a low-level period (active pulse period) during which the switch SW2 is turned on.

The analog-digital conversion circuit ADC repeats the above operation. While the switch SW1 is off, that is, during a data conversion period tconv, the counter Count counts a discharge count count of the discharging circuit 28 so as to output a digital value ADCOUT corresponding to the current Iin inputted.

The analog-digital conversion circuit ADC operates in such a manner that an electric charge stored due to the current Iin inputted is equal in amount to an electric charge released due to a current I flowing through the discharging circuit 28. Thus, the equation "the amount of an electric charge stored"="the amount of an electric charge released" is expressed by the following Formula (2):

$$Iin \times tconv = I \times tclk \times count \qquad (2).$$

From the above Formula (2), the following Formula (3) is derived:

$$count = (Iin \times tconv)/(I \times tclk) \qquad (3).$$

In the above Formula (3), tclk is a cycle of the clock signal clk, tconv is a time period during which an electric charge is stored due to the current Iin, I is a value of a reference current, and count is a count of discharges by the discharging circuit 28.

Thus, a minimum resolving power is determined by (I×tclk).

In a case where the charging period tconv is set as in the following Formula (4):

$$tconv = tclk \times 2^n \text{ (where } n \text{ is a resolving power)} \quad (4),$$

the following Formula (5) is derived:

$$count = Iin/I \times 2^n \quad (5).$$

In a case where, for example, the resolving power n=16 bits, the counter Count outputs, in correspondence with the input current Iin, a value within a range from 0 to 65535.

With the above arrangement, the integrating analog-digital conversion circuit ADC is capable of an analog-digital conversion with a wide dynamic range and a highly precise resolution.

The following describes a case in which the analog-digital conversion circuit ADC, having the above arrangement, is used as the analog-digital conversion circuit ADC1.

In a case where the analog-digital conversion circuit ADC1 carries out an analog-digital conversion with respect to the current Iin1, flowing through the photodiode PD1, with use of a reference current I1, the following Formula (6) holds:

$$count1 = Iin1/I1 \times 2^n \quad (6).$$

In the above case, the analog-digital conversion circuit ADC1 outputs, as the bitstream signal charge1, high-level signals in a number accurately equal to count1.

(Current Output Circuit)

Figure 4:
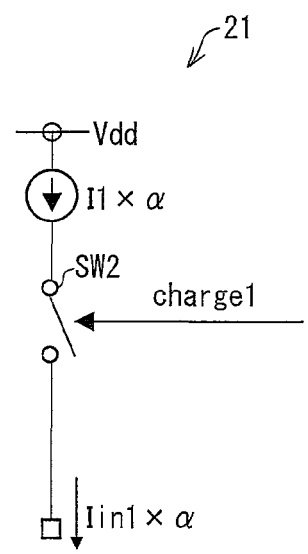
FIG. 4(a) is a circuit diagram illustrating an arrangement of a current output circuit in the illuminance sensor of the embodiment of the present invention.
FIG. 4(b) is a waveform chart illustrating currents outputted from the current output circuit in the illuminance sensor of the embodiment of the present invention.
Figure 4:
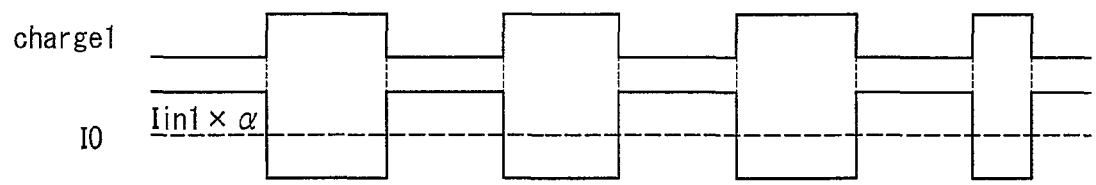

The following describes, with reference to FIGS. 4(a) and 4(b), an arrangement of the current output circuit 21 of the present embodiment. FIG. 4(a) is a circuit diagram illustrating the arrangement of the current output circuit 21 of the present embodiment. FIG. 4(b) is a waveform chart illustrating a relation between a bitstream signal charge1 and an output current I0 both inputted to the current output circuit 21.

As illustrated in FIGS. 4(a) and 4(b), the current output circuit 21 is controlled on the basis of the bitstream signal charge1 of the analog-digital conversion circuit ADC1.

Specifically, the current output circuit 21 includes a switch SW2 which is turned on during a low period (active pulse period) of the bitstream signal charge1 so as to output a current.

The current output circuit 21 outputs an output pulse current, which is then integrated, that is, averaged, in the charging circuit (integrating circuit) 25 of the analog-digital circuit ADC2 during an analog-digital conversion period of the analog-digital conversion circuit ADC2. This allows a current to be obtained which is larger than the current Iin1 by a factor of a predetermined coefficient. The above analog-digital conversion period is equal in length to the charging period tconv.

The output current I0 of the current output circuit 21 has a mean value expressed in the following Formula (7):

$$I0 = I1 \times \alpha \times (\text{count } 1/2^n) \quad (7)$$
$$= I1 \times \alpha \times (Iin1/I1)$$
$$= Iin1 \times \alpha.$$

In the above Formula (7), α is a random coefficient (where α>1).

In a case where the analog-digital conversion circuit ADC2 carries out, with use of the reference current I2, an analog-digital conversion with respect to a current (Iin2−Iin1×α) which is obtained by subtracting the output current I0 of the current output circuit 21 from the current Iin2 flowing through the photodiode PD2, the following Formula (8) holds:

$$count2 = (Iin2 - Iin1 \times \alpha)/I2 \times 2^n \quad (8).$$

The above arrangement, as described above, allows the analog-digital conversion circuit ADC2 to directly carry out an analog-digital conversion with respect to the current (Iin2−Iin1×α; third current). The arrangement consequently allows the spectral-response characteristic of the illuminance sensor 20 to approximate to the spectral luminous efficacy accurately.

Further, in the analog-digital conversion circuit ADC illustrated in FIG. 2, a voltage to be supplied to the amplifier AMP1 can be set to 0 V. This makes it possible to set a voltage across each of the photodiodes PD1 and PD2 to 0 V. The above arrangement consequently reduces a dark current through each of the photodiodes PD1 and PD2, and thus allows precise measurement of even a low illuminance.

In the case where the voltage across each of the photodiodes PD1 and PD2 is set to 0 V, that is, no forward bias voltage is applied to the photodiodes PD1 and PD2, the photodiodes PD1 and PD2 each output a reduced photoelectric current as compared to the case where a reverse bias voltage is applied to the photodiodes PD1 and PD2. However, adjusting the reference current I for the analog-digital conversion circuit ADC makes it possible to measure a high illuminance similarly.

In the case of, for example, the analog-digital conversion circuit ADC1, the above Formula (6) indicates that even if setting a voltage across the photodiode PD1 to 0 V decreases a sensitivity for the current Iin1 by approximately 20%, decreasing a sensitivity for the current I1 by 20% makes it possible to measure a high illuminance similarly.

The above arrangement further eliminates the need to separately provide a multiplication circuit and a subtraction circuit, and thus reduces a circuit complexity.

(Spectral-Response Characteristics of Photodiodes PD1 and PD2: Part 1)

Figure 5:
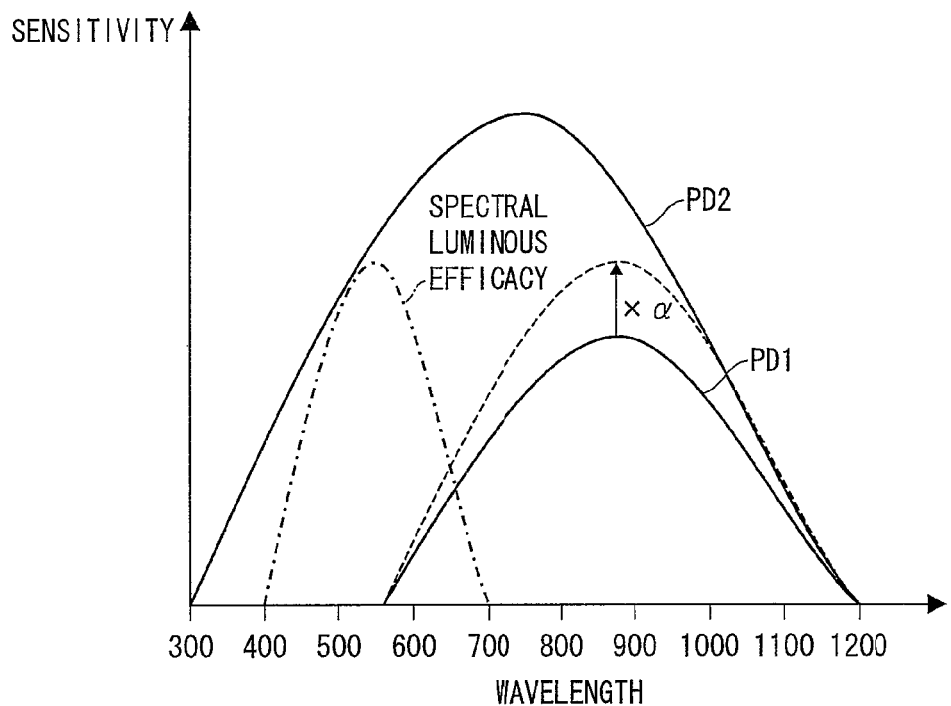
FIG. 5 is a graph illustrating an example of spectral-response characteristics of photodiodes PD1 and PD2 in the illuminance sensor of the embodiment of the present invention.

The following describes, with reference to FIG. 5, an example of spectral-response characteristics of the photodiodes PD1 and PD2.

FIG. 5 is a graph illustrating an example of spectral-response characteristics of the photodiodes PD1 and PD2. FIG. 5 illustrates (i) two solid lines indicative of respective spectral-response characteristics of the photodiodes PD1 and PD2, (ii) a dashed line indicative of a spectral-response characteristic of the photodiode PD1 for a case in which the reference current I1 is multiplied by a random coefficient α, and (iii) a dotted-and-dashed line indicative of a spectral luminous efficacy.

As illustrated in FIG. 5, the photodiode PD1 has a spectral-response characteristic for an infrared wavelength range, whereas the photodiode PD2 has a spectral-response characteristic for a range from a visible wavelength range to the infrared wavelength range.

In a case where the reference current I1 is multiplied by a coefficient α, a current corresponding to an amount of the current Iin1 through the photodiode PD1 can be set to have a value obtained by multiplying the current Iin1 by the random coefficient.

In a case where, for example, there is a difference of approximately 20% in current amount for an infrared component between the photodiode PD1, which has a spectral-response characteristic for the infrared wavelength range, and the photodiode PD2, which has a spectral-response characteristic for the range from the visible wavelength range to the infrared wavelength range, increasing the reference current Iin1 by a factor of 1.2 reduces an influence of the infrared component, and thus makes it possible to obtain a spectral-response characteristic suitable for the spectral luminous efficacy.

In the liquid crystal display device 100, such as a mobile telephone and a digital camera, the illuminance sensor 20 is typically mounted in the liquid crystal panel 10. In such a case, the liquid crystal panel 10 has a transmittance which influences an amount of light received by each of the photodiodes PD1 and PD2.

In a case where, for example, (i) while the liquid crystal display device 100 does not include the liquid crystal panel 10, there is a difference of approximately 20% in current amount for an infrared component between the photodiode PD1, which has a spectral-response characteristic for the infrared wavelength range, and the photodiode PD2, which has a spectral-response characteristic for the range from the visible wavelength range to the infrared wavelength range, and (ii) while the liquid crystal display device 100 does include the liquid crystal panel 10, there is a difference of approximately 10% in current amount for an infrared component between the photodiode PD1, which has a spectral-response characteristic for the infrared wavelength range, and the photodiode PD2, which has a spectral-response characteristic for the range from the visible wavelength range to the infrared wavelength range, increasing the reference current Iin1 by a factor of 1.1 reduces an influence of the infrared component, and thus makes it possible to obtain a spectral-response characteristic suitable for the spectral luminous efficacy.

The transmittance of the liquid crystal panel 10 depends on each individual user who uses the liquid crystal panel 10. The influence of the liquid crystal panel 10 can be adjusted by making it possible to change, in a register (memory device) inside the circuitry, settings of the random coefficient $\alpha$ (within a range from 1 to 1.5) for the reference current Iin1.

The respective light reception amounts for the photodiodes PD1 and PD2 are further influenced by a light source. The photodiodes PD1 and PD2 each generate an amount of current, the amount varying among different light sources, for example, (i) a fluorescent lamp, which emits a small amount of infrared light, and (ii) an A illuminant and sunlight, each of which emits a large amount of infrared light.

Figure 6:
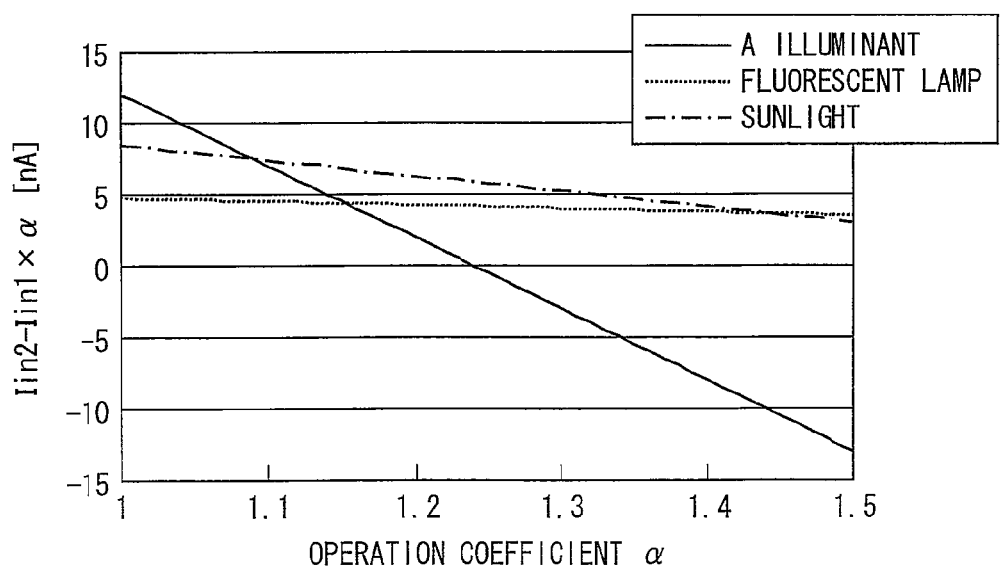
FIG. 6 is a waveform chart illustrating a relation between a current ($Iin2-Iin1\times\alpha$) and a coefficient $\alpha$ for different light sources, the relation being observed in the illuminance sensor of the embodiment of the present invention.

FIG. 6 is a waveform chart illustrating a relation between the current (Iin2−Iin1×$\alpha$) and the coefficient $\alpha$ for the different light sources. FIG. 6 illustrates (i) a solid line indicative of a relation between the current (Iin2−Iin1×$\alpha$) and the coefficient $\alpha$ for the A illuminant, (ii) a dashed line indicative of a relation between the current (Iin2−Iin1×$\alpha$) and the coefficient $\alpha$ for a fluorescent lamp, and (iii) a dotted-and-dashed line indicative of a relation between the current (Iin2−Iin1×$\alpha$) and the coefficient $\alpha$ for sunlight.

FIG. 6 indicates that for a constant coefficient $\alpha$, there is a variation among the different light sources in the current (Iin2−Iin1×$\alpha$) which is obtained by subtracting, from the current Iin2 through the photodiode PD2, a current corresponding to the current Iin1 through the photodiode PD1.

Table 1 below specifies the current Iin1, the current Iin2, and the current (Iin2−Iin1×$\alpha$) for each light source.

TABLE 1

|  | A illuminant | Fluorescent lamp | Sunlight |
| --- | --- | --- | --- |
| Iin1 | 50 nA | 2.47 nA | 10.93 nA |
| Iin2 | 62 nA | 7.23 nA | 19.39 nA |

TABLE 1-continued

|  | A illuminant | Fluorescent lamp | Sunlight |
| --- | --- | --- | --- |
| Iin2 − Iin1 * 1.00 | 12 nA | 4.76 nA | 8.46 nA |
| Iin2 − Iin1 * 1.10 | 7 nA | 4.513 nA | 7.367 nA |
| Iin2 − Iin1 * 1.15 | 4.5 nA | 4.39 nA | 6.82 nA |
| Iin2 − Iin1 * 1.20 | 2 nA | 4.266 nA | 6.274 nA |
| Iin2 − Iin1 * 1.45 | −10.5 nA | 3.64 nA | 3.54 nA |

Table 1 and FIG. 6 indicate that setting the coefficient $\alpha$ within a range from 1.1 to 1.2 allows a reduction in difference among respective illuminance properties of the above light sources (namely, the A illuminant, a fluorescent lamp, and sunlight).

Setting the coefficient $\alpha$ to 1.15, in particular, allows the most efficient reduction in difference among the respective illuminance properties of the light sources.

(Structures of Photodiodes PD1 and PD2: Part 1)

The following describes, with reference to FIGS. 7(*a*) and 7(*b*), respective structures of the photodiodes PD1 and PD2 having the respective spectral-response characteristics illustrated in FIG. 5. FIG. 7(*a*) is a circuit diagram illustrating a structure of the photodiode PD1. FIG. 7(*b*) is a circuit diagram illustrating a structure of the photodiode PD2.

The photodiode PD1 having a spectral-response characteristic for the infrared wavelength range has a first layered structure (see FIG. 7(*a*)) including (i) a P layer, (ii) an N well enclosing the P layer, and (iii) a P diffusion layer (Psub) enclosing the N well. The photodiode PD1 includes a photodiode PDvis at a P layer-N well junction and a photodiode PDir at an N well-P diffusion layer junction. The photodiode PDvis formed at the P layer-N well junction has an anode and a cathode which are short-circuited with respect to each other and connected with a cathode of the photodiode PDir. The cathode of the photodiode PDir is connected with the node A in FIG. 1. The photodiode PDir has an anode connected with a ground GND.

The photodiode PD1 includes the photodiode PDvis formed at the shallower junction, that is, at the P layer-N well junction, and thus absorbs light within the range from the visible wavelength range to a near-infrared wavelength range. The short circuit of the anode and cathode of the photodiode PDvis causes an invalidation of the light which falls within the range from the visible wavelength range to the near-infrared wavelength range and which is absorbed at the shallower junction, whereas the photodiode PDir receives infrared light so as to generate a photoelectric current. The above structure consequently imparts, to the photodiode PD1 as a whole, a spectral-response characteristic for the infrared wavelength range.

The photodiode PD2 having a spectral-response characteristic for the range from the visible wavelength range to the infrared wavelength range has a second layered structure identical to the first layered structure (see FIG. 7(*b*)), the second layered structure including (i) a P layer, (ii) an N well enclosing the P layer, and (iii) a P diffusion layer (Psub) enclosing the N well. The photodiode PD2 includes a photodiode PDvis at a P layer-N well junction and a photodiode PDir at an N well-P diffusion layer junction. The photodiode PDvis has (i) a cathode connected with a cathode of the photodiode PDir and (ii) an anode connected with a ground. The photodiode PDir has (i) a cathode connected with the node B in FIG. 1 and (ii) an anode connected with a ground. The photodiode PDvis receives light within the range from the visible wavelength range to the near-infrared wavelength range so as to generate a photoelectric current, whereas the photodiode PDir receives infrared light so as to generate a photoelectric current.

(Spectral-Response Characteristics of Photodiodes PD1 and PD2: Part 2)

FIG. 8 is a graph illustrating another example of spectral-response characteristics of the photodiodes PD1 and PD2. FIG. 8 illustrates (i) two solid lines indicative of respective spectral-response characteristics of the photodiodes PD1 and PD2, (ii) a dashed line indicative of a spectral-response characteristic of the photodiode PD1 for a case in which the reference current Iin1 is multiplied by a random coefficient α, and (iii) a dotted-and-dashed line indicative of a spectral luminous efficacy.

As illustrated in FIG. 8, the photodiode PD1 has a spectral-response characteristic for an infrared wavelength range, whereas the photodiode PD2 has a spectral-response characteristic for a range from a visible wavelength range to the infrared wavelength range.

In a case where the reference current Iin1 is multiplied by a coefficient α, a current corresponding to an amount of the current Iin1 through the photodiode PD1 can be set to have a value obtained by multiplying the current Iin1 by the random coefficient.

Adjusting the coefficient α to adjust a current (Iin2−Iin1×α) allows a spectral-response characteristic of the illuminance sensor 20 to be adjusted suitably for the spectral luminous efficacy.

(Structures of Photodiodes PD1 and PD2: Part 2)

Figure 9:
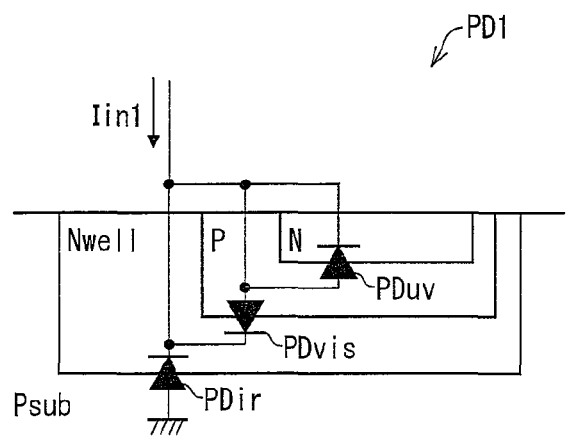
FIG. 9(a) is a circuit diagram illustrating respective structures of the photodiodes PD1 and PD2 (specifically, a structure of the photodiode PD1) having the respective spectral-response characteristics illustrated in FIG. 8, the photodiodes PD1 and PD2 being included in the illuminance sensor of the embodiment of the present invention.
FIG. 9(b) is a circuit diagram illustrating respective structures of the photodiodes PD1 and PD2 (specifically, a structure of the photodiode PD2) having the respective spectral-response characteristics illustrated in FIG. 8, the photodiodes PD1 and PD2 being included in the illuminance sensor of the embodiment of the present invention.
Figure 9:
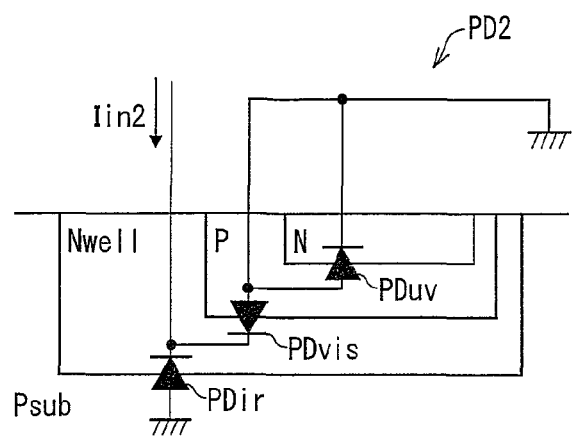

The following describes, with reference to FIGS. 9(a) and 9(b), respective structures of the photodiodes PD1 and PD2 having the respective spectral-response characteristics illustrated in FIG. 8. FIG. 9(a) is a circuit diagram illustrating a structure of the photodiode PD1. FIG. 9(b) is a circuit diagram illustrating a structure of the photodiode PD2.

The photodiode PD1 having a spectral-response characteristic for the infrared wavelength range has a third layered structure (see FIG. 9(a)) including (i) an N layer, (ii) a P layer provided so as to enclose and form a junction with the N layer, (iii) an N well enclosing the P layer, and (iv) a P diffusion layer (Psub) enclosing the N well. The photodiode PD1 includes three photodiodes PDvis, PDir, and PDuv respectively at an N layer-P layer junction, a P layer-N well junction, and an N well-P diffusion layer junction. The photodiode PDuv formed at the N layer-P layer junction has an anode and a cathode which are short-circuited with respect to each other and connected with a cathode of the photodiode PDir. The photodiode PDvis formed at the P layer-N well junction also has an anode and a cathode which are short-circuited with respect to each other and connected with the cathode of the photodiode PDir. The cathode of the photodiode PDir is connected with the node A in FIG. 1. The photodiode PDir has an anode connected with a ground.

The photodiode PD1 includes the photodiode PDvis formed at a shallower junction, that is, at the P layer-N well junction, and thus absorbs light within the range from the visible wavelength range to a near-infrared wavelength range. The short circuit of the anode and cathode of the photodiode PDvis causes an invalidation of the light which falls within the range from the visible wavelength range to the near-infrared wavelength range and which is absorbed at the shallower junction, whereas the photodiode PDir receives infrared light so as to generate a photoelectric current. The above structure consequently imparts, to the photodiode PD1 as a whole, a spectral-response characteristic for the infrared wavelength range.

The photodiode PD2 having a spectral-response characteristic for the range from the visible wavelength range to the infrared wavelength range has a fourth layered structure identical to the third layered structure (see FIG. 9(b)), the fourth layered structure including (i) an N layer, (ii) a P layer provided so as to enclose and form a junction with the N layer, (iii) an N well enclosing the P layer, and (iv) a P diffusion layer (Psub) enclosing the N well. The photodiode PD2 includes three photodiodes PDvis, PDir, and PDuv respectively at an N layer-P layer junction, a P layer-N well junction, and an N well-P diffusion layer junction. The photodiode PDuv formed at the N layer-P layer junction has an anode and a cathode which are short-circuited with respect to each other and connected with an anode of the photodiode PDvis. The photodiode PDvis has (i) a cathode connected with a cathode of the photodiode PDir and (ii) the anode, which is connected with a ground. The cathode of the photodiode PDir is connected with the node B in FIG. 1. The photodiode PDir has an anode connected with a ground. The photodiode PDvis receives light within the range from the visible wavelength range to the near-infrared wavelength range so as to generate a photoelectric current, whereas the photodiode PDir receives infrared light so as to generate a photoelectric current.

The photodiodes PD1 and PD2 each include the photodiode PDuv at a shallower junction, that is, at the N layer-P layer junction, and thus absorbs ultraviolet light. The short circuit of the anode and cathode of the photodiode PDuv causes an invalidation of the ultraviolet light absorbed at the shallower junction. The above structure consequently allows a spectral-response characteristic for ultraviolet light to be reduced in the photodiodes PD1 and PD2 as a whole. In the above structure, a shallower junction absorbs a shorter-wavelength component in incident light, whereas a deeper junction absorbs a longer-wavelength component in incident light.

The respective light reception amounts for the photodiodes PD1 and PD2 are, as described above, influenced by a light source.

Table 2 below specifies the current Iin1, the current Iin2, and the current (Iin2−Iin1×α) for each light source.

TABLE 2

|  | A illuminant | Fluorescent lamp | Sunlight |
|---|---|---|---|
| Iin1 | 37.6 nA | 2.53 nA | 9.16 nA |
| Iin2 | 45.8 nA | 5.28 nA | 13.5 nA |
| Iin2 − Iin1 * 1.00 | 8.2 nA | 2.75 nA | 4.34 nA |
| Iin2 − Iin1 * 1.10 | 4.44 nA | 2.497 nA | 3.424 nA |
| Iin2 − Iin1 * 1.15 | 2.56 nA | 2.37 nA | 2.966 nA |
| Iin2 − Iin1 * 1.20 | 0.68 nA | 2.24 nA | 2.50 nA |
| Iin2 − Iin1 * 1.45 | −8.72 nA | 1.61 nA | 0.21 nA |

Table 2 indicates that setting the coefficient α within a range from 1.1 to 1.2 allows a reduction in difference among respective illuminance properties of the above light sources (namely, the A illuminant, a fluorescent lamp, and sunlight).

Setting the coefficient α to 1.15, in particular, allows the most efficient reduction in difference among the respective illuminance properties of the light sources.

(Spectral-Response Characteristics of Photodiodes PD1 and PD2: Part 3)

Figure 10:
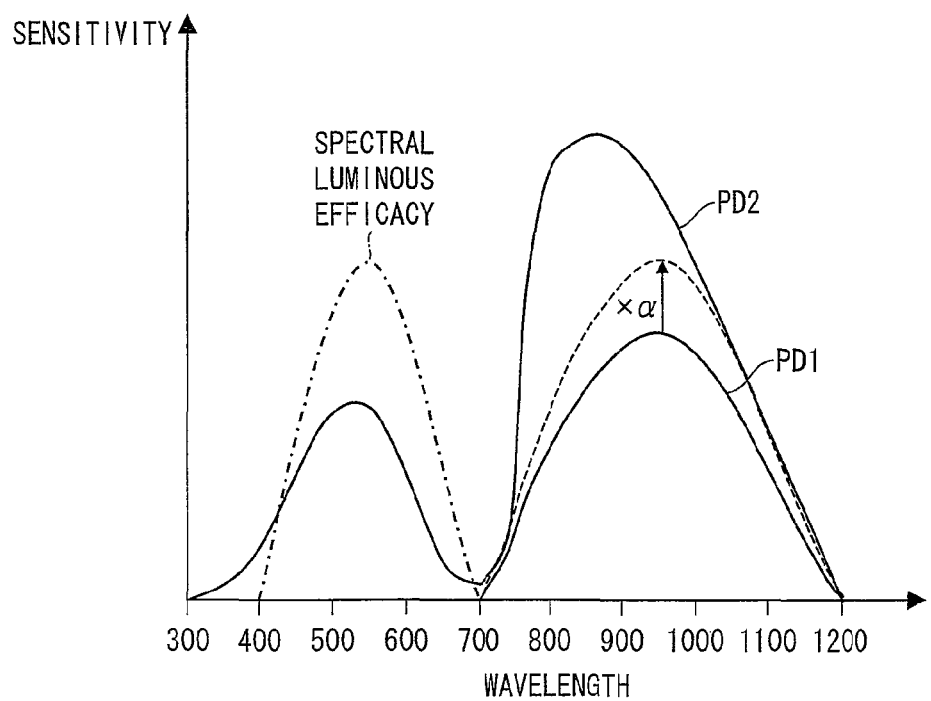
FIG. 10 is a graph illustrating still another example of spectral-response characteristics of photodiodes PD1 and PD2 in the illuminance sensor of the embodiment of the present invention.

FIG. 10 is a graph illustrating still another example of spectral-response characteristics of the photodiodes PD1 and PD2. FIG. 10 illustrates (i) two solid lines indicative of respective spectral-response characteristics of the photodiodes PD1 and PD2, (ii) a dashed line indicative of a spectral-response characteristic of the photodiode PD1 for a case in which the reference current I1 is multiplied by a random coefficient α, and (iii) a dotted-and-dashed line indicative of a spectral luminous efficacy.

As illustrated in FIG. 10, the photodiode PD1 has a spectral-response characteristic for an infrared wavelength range, whereas the photodiode PD2 mainly has a spectral-response characteristic for a range including a green wavelength range and the infrared wavelength range.

In a case where the reference current I1 is multiplied by a coefficient α, a current corresponding to an amount of the current Iin1 through the photodiode PD1 can be set to have a value obtained by multiplying the current Iin1 by the random coefficient.

Adjusting the coefficient α to adjust a current (Iin2−Iin1× α) allows a spectral-response characteristic of the illuminance sensor 20 to be adjusted suitably for the spectral luminous efficacy.

(Structures of Photodiodes PD1 and PD2: Part 3)

Figure 11:
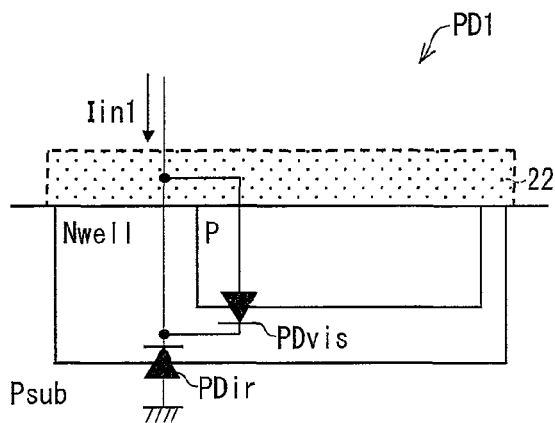
FIG. 11(a) is a circuit diagram illustrating respective structures of the photodiodes PD1 and PD2 (specifically, a structure of the photodiode PD1) having the respective spectral-response characteristics illustrated in FIG. 10, the photodiodes PD1 and PD2 being included in the illuminance sensor of the embodiment of the present invention.
FIG. 11(b) is a circuit diagram illustrating respective structures of the photodiodes PD1 and PD2 (specifically, a structure of the photodiode PD2) having the respective spectral-response characteristics illustrated in FIG. 10, the photodiodes PD1 and PD2 being included in the illuminance sensor of the embodiment of the present invention.
Figure 11:
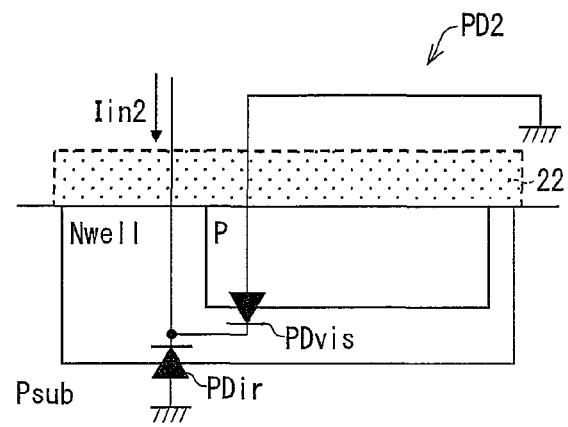

The following describes, with reference to FIGS. 11(a) and 11(b), respective structures of the photodiodes PD1 and PD2 having the respective spectral-response characteristics illustrated in FIG. 10. FIG. 11(a) is a circuit diagram illustrating a structure of the photodiode PD1. FIG. 11(b) is a circuit diagram illustrating a structure of the photodiode PD2.

The photodiode PD1 having a spectral-response characteristic for the infrared wavelength range has, as in FIGS. 7(a) and 7(b), a structure (see FIG. 11(a)) including (i) a P layer, (ii) an N well enclosing the P layer, and (iii) a P diffusion layer (Psub) enclosing the N well. The photodiode PD1 includes a photodiode PDvis at a P layer-N well junction and a photodiode PDir at an N well-P diffusion layer junction. The photodiode PDvis formed at the P layer-N well junction has an anode and a cathode which are short-circuited with respect to each other. The photodiode PD1 is provided, on a front surface side of its substrate, with a green color transmitting filter 22 which transmits, toward its light receiving surface, mainly light within the range including the green wavelength range and the infrared wavelength range.

The photodiode PD2 having a spectral-response characteristic for light within the range from the visible wavelength range to the infrared wavelength range has, as in FIGS. 7(a) and 7(b), a structure (see FIG. 11(b)) including (i) a P layer, (ii) an N well enclosing the P layer, and (iii) a P diffusion layer (Psub) enclosing the N well. The photodiode PD2 includes a photodiode PDvis at a P layer-N well junction and a photodiode PDir at an N well-P diffusion layer junction. The photodiode PD2 is provided, on a front surface side of its substrate, with a green color transmitting filter 22 which transmits mainly light within the range including the green wavelength range and the infrared wavelength range.

The above structures allow the illuminance sensor 20 to have a spectral-response characteristic which further approximates to the spectral luminous efficacy.

The respective light reception amounts for the photodiodes PD1 and PD2 are, as described above, influenced by a light source.

Table 3 below specifies the current Iin1, the current Iin2, and the current (Iin2−Iin1×α) for each light source.

TABLE 3

|  | A illuminant | Fluorescent lamp | Sunlight |
|---|---|---|---|
| Iin1 | 25.9 nA | 0.82 nA | 5.43 nA |
| Iin2 | 31.4 nA | 2.66 nA | 8.58 nA |
| Iin2 − Iin1 * 1.00 | 5.5 nA | 1.84 nA | 3.15 nA |
| Iin2 − Iin1 * 1.10 | 2.91 nA | 1.758 nA | 2.607 nA |

TABLE 3-continued

|  | A illuminant | Fluorescent lamp | Sunlight |
|---|---|---|---|
| Iin2 − Iin1 * 1.15 | 1.61 nA | 1.71 nA | 2.33 nA |
| Iin2 − Iin1 * 1.20 | 0.32 nA | 1.67 nA | 2.06 nA |
| Iin2 − Iin1 * 1.45 | −6.15 nA | 1.471 nA | 0.70 nA |

Table 3 indicates that setting the coefficient α within a range from 1.1 to 1.2 allows a reduction in difference among respective illuminance properties of the above light sources (namely, the A illuminant, a fluorescent lamp, and sunlight).

Setting the coefficient α to 1.15, in particular, allows the most efficient reduction in difference among the respective illuminance properties of the light sources.

In the liquid crystal display device 100 of the present embodiment, the illuminance sensor 20, as described above, includes no current mirror circuit, and thus prevents the problem of a large error.

Since the illuminance sensor 20 allows a direct analog-digital conversion with respect to the current (Iin2−Iin1×α), the illuminance sensor 20 can have a spectral-response characteristic which accurately approximates to the spectral luminous efficacy, and thus facilitates data processing.

Further, since a voltage across each of the photodiodes PD1 and PD2 included in the illuminance sensor 20 can be set to 0 V, the illuminance sensor 20 can reduce a dark current and accurately measure even a low illuminance.

Embodiment 2

Figure 13:
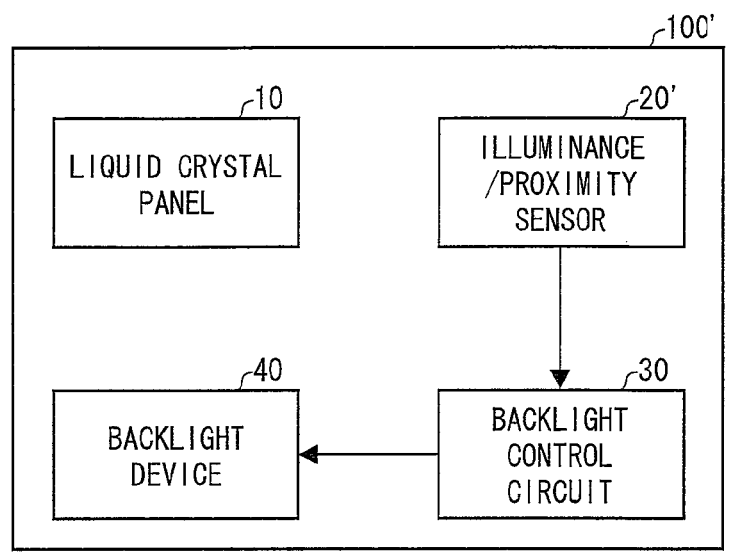
FIG. 13 is a block diagram illustrating an overall arrangement of a liquid crystal display device of Embodiment 2 of the present invention.
Figure 14:
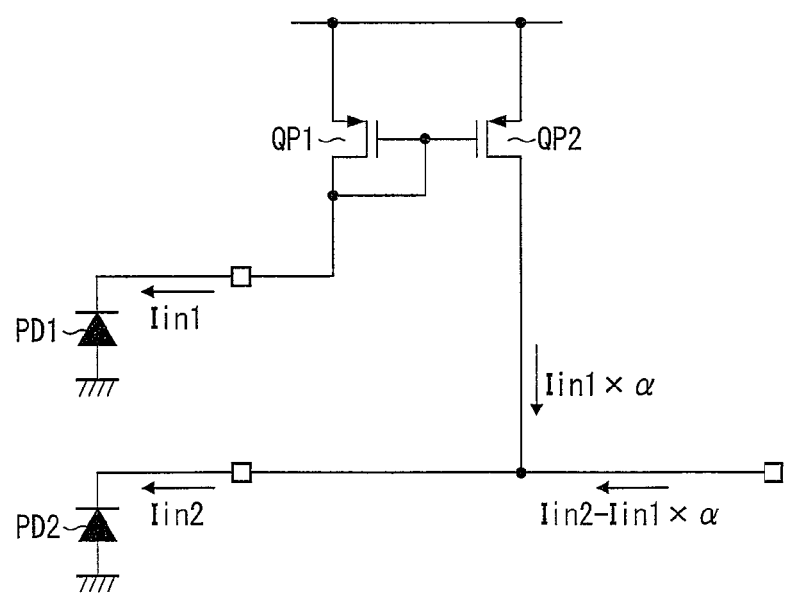
FIG. 14 is a circuit diagram illustrating a main arrangement of an illuminance sensor including a conventional current mirror circuit.
Figure 15:
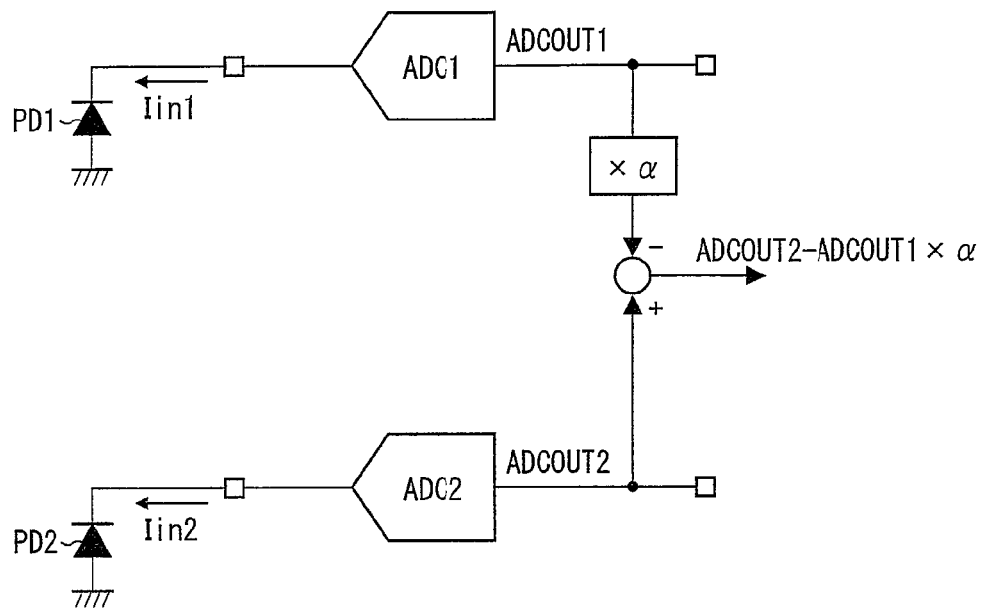
FIG. 15 is a circuit diagram illustrating a main arrangement of an illuminance sensor including a conventional analog-digital conversion circuit.

Another embodiment of the liquid crystal display device of the present invention will be described below with reference to FIG. 13. FIG. 13 is a block diagram illustrating an arrangement of a liquid crystal display device of the present embodiment.

For convenience of explanation, members of the present embodiment which are identical in function to their respective equivalents illustrated in the drawings referred to in Embodiment 1 above are each assigned the same reference numeral, and are thus not described here.

As illustrated in FIG. 13, the liquid crystal display device 100' includes a liquid crystal panel 10, an illuminance/proximity sensor 20', a backlight control circuit 30, and a backlight device 40.

The illuminance/proximity sensor 20' receives environmental light so as to measure brightness of the environment, and further receives a particular reflected light so as to detect whether a detection object is present.

The illuminance/proximity sensor 20' includes a circuit such as that illustrated in FIG. 1, and further includes (i) a light-emitting diode (luminous body; not shown) for emitting a particular light and (ii) a control circuit (not shown).

Figure 16:
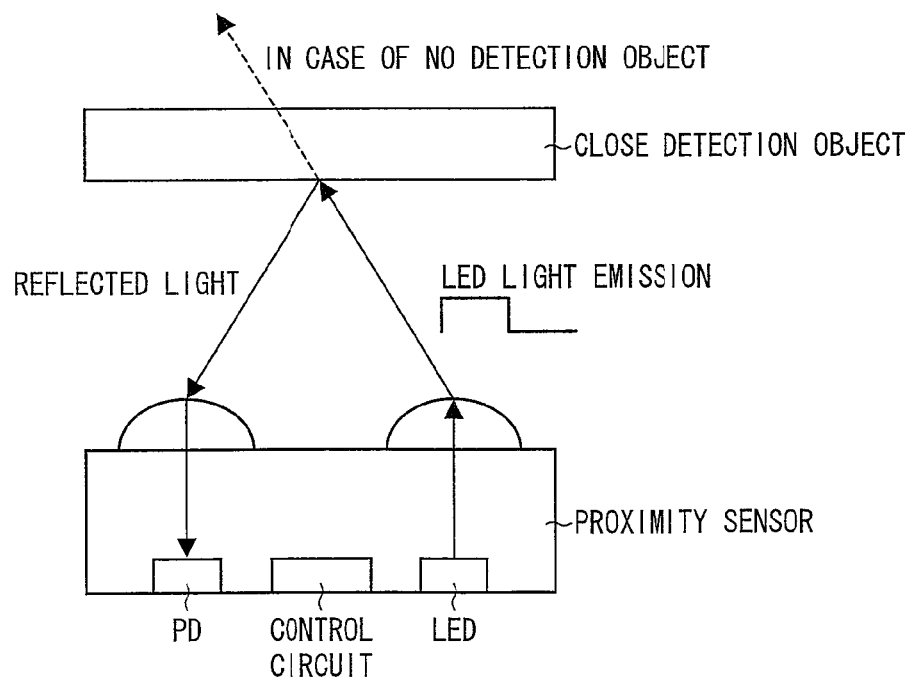
FIG. 16 is a view schematically illustrating an arrangement of a proximity sensor.
Figure 17:
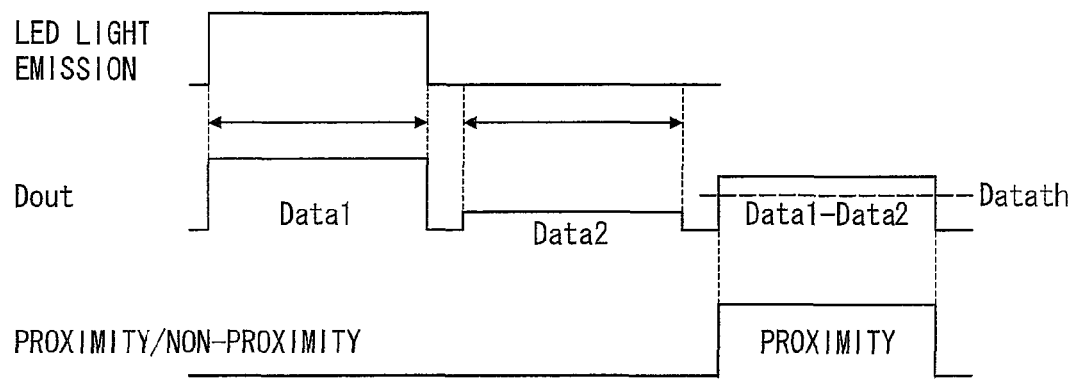
FIG. 17(a) is a waveform chart for proximity/non-proximity, detected by the proximity sensor, of a detection object, specifically for a case in which proximity of a detection object is detected.
FIG. 17(b) is a waveform chart for proximity/non-proximity, detected by the proximity sensor, of a detection object, specifically for a case in which non-proximity of a detection object is detected.
Figure 17:
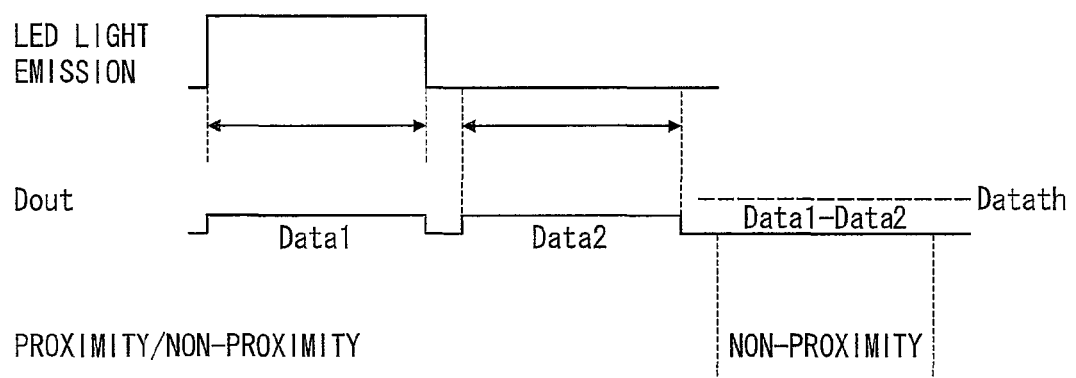

The light-emitting diode is driven by the control circuit and thus emits infrared light as the above particular light. Environmental light such as sunlight and light from a fluorescent lamp includes only a small proportion of infrared light. The photodiode PD1 thus has a current Iin1 flowing therethrough mainly in correspondence with an amount of infrared light emitted from the light-emitting diode. The current Iin1 is subjected to an analog-digital conversion by the analog-digital conversion circuit ADC1, and is thus outputted as a digital value ADCOUT1. The digital value ADCOUT1 is supplied to the control circuit for determination of whether a detection object is present. The above description has already dealt, in reference to FIGS. 16, 17(a), and 17(b), with the principle of how a proximity sensor determines whether a detection object is present. The principle is thus not described here in detail.

The backlight control circuit 30 receives (i) a digital value ADCOUT2, which is obtained by an analog-digital conversion by the analog-digital conversion circuit ADC2 with respect to a current (Iin2−Iin1×α) and (ii) a signal indicative of whether a detection object is present. The backlight control circuit 30 thus controls the backlight device 40.

The backlight control circuit 30, for example, upon receipt of a signal indicative of proximity of a detection object (for example, a human face), determines that the liquid crystal display device 100' has no need to carry out display and turns the backlight device 40 off. The backlight control circuit 30, upon receipt of a signal indicative of non-proximity of a detection object, (i) determines that the liquid crystal display device 100' needs to carry out display and (ii) turns the backlight device 40 on and causes it to emit light on the basis of the received digital value ADCOUT2 so as to correspond to the environmental brightness. This operation reduces power consumption of the liquid crystal display device 100'.

In a proximity sensor, a difference between (i) a current flowing while its light-emitting diode is driven and (ii) a current flowing while the light-emitting diode is not driven is inversely proportional to the square of a detection distance. The proximity sensor can thus be used as a distance measuring sensor which calculates a detection distance from the above difference.

The backlight control circuit 30 causes the backlight device 40 to emit light in correspondence with a distance to a detection object. This arrangement reduces power consumption of the liquid crystal display device 100'.

The embodiments of the present invention each describe a case in which the illuminance sensor is contained in a liquid crystal display device. The present invention is, however, not limited to such an arrangement. The illuminance sensor can alternatively be contained in, for example, an organic EL display device, and thus detect environmental brightness so as to control brightness (light emission amount) of the organic EL display device.

The present invention is not limited to the description of the embodiments above, but may be altered in various ways by a skilled person within the scope of the claims. Any embodiment based on a proper combination of technical means disclosed in different embodiments is also encompassed in the technical scope of the present invention.

The illuminance sensor of the present invention may preferably be arranged such that the second analog-digital conversion circuit is identical in circuit configuration to the first analog-digital conversion circuit.

The above arrangement allows the second analog-digital conversion circuit to have a simple configuration to achieve a highly precise resolution.

The illuminance sensor of the present invention may preferably be arranged such that the first light receiving element has a spectral-response characteristic for an infrared wavelength range; and the second light receiving element has a spectral-response characteristic for a range from a visible wavelength range to the infrared wavelength range.

The above arrangement can efficiently prevent light within the infrared wavelength range from affecting the illuminance sensor.

The illuminance sensor of the present invention may preferably be arranged such that no bias voltage is applied to the first light receiving element.

The above arrangement can prevent a dark current in the first light receiving element, and can thus allow accurate measurement of even a low illuminance.

The illuminance sensor of the present invention may preferably be arranged such that no bias voltage is applied to the second light receiving element.

The above arrangement can prevent a dark current in the second light receiving element, and can thus allow accurate measurement of even a low illuminance.

The illuminance sensor of the present invention may preferably be arranged such that the current outputted by the current output circuit has a mean value during an analog-digital conversion period for the second analog-digital conversion circuit which mean value is obtained by multiplying a value of the first current by a coefficient which is capable of being set variably.

The above arrangement can adjust the coefficient, and thus allows the spectral-response characteristic of the illuminance sensor to approximate to the spectral luminous efficacy accurately.

The illuminance sensor of the present invention may preferably be arranged such that the coefficient is set within a range from 1.1 to 1.2.

The above arrangement allows the spectral-response characteristic of the illuminance sensor to approximate to the spectral luminous efficacy accurately.

The illuminance sensor of the present invention may preferably be arranged such that the coefficient is set to 1.15.

The above arrangement allows the spectral-response characteristic of the illuminance sensor to approximate to the spectral luminous efficacy accurately.

The illuminance sensor of the present invention may preferably be arranged such that the first light receiving element and the second light receiving element are each provided with a filter for transmitting, toward a light receiving surface thereof, light within a green wavelength range and light within a infrared wavelength range.

The above arrangement blocks light incident on the first light receiving element and the second light receiving element which light is other than light within the green wavelength range and the infrared wavelength range. The arrangement consequently allows the spectral-response characteristic of the illuminance sensor to approximate to the spectral luminous efficacy accurately.

The illuminance sensor of the present invention may preferably be arranged such that the first light receiving element has a first layered structure including a first P layer, a first N well enclosing the first P layer, and a first P diffusion layer enclosing the first N well, the first layered structure further including (i) a photodiode formed at a junction between the first P layer and the first N well and (ii) a photodiode formed at a junction between the first N well and the first P diffusion layer, the photodiode formed at the junction between the first P layer and the first N well having an anode and a cathode which are short-circuited with respect to each other; and the second light receiving element has a second layered structure identical to the first layered structure, the second layered structure including a second P layer, a second N well enclosing the second P layer, and a second P diffusion layer enclosing the second N well, the second layered structure further including (i) a photodiode formed at a junction between the second P layer and the second N well and (ii) a photodiode formed at a junction between the second N well and the second P diffusion layer.

The above arrangement achieves the following: The first light receiving element includes a photodiode formed at the shallower junction, that is, the P layer-N well junction, the photodiode absorbing light within the range from the visible wavelength range to the near-infrared wavelength range. The photodiode has an anode and a cathode which are short-circuited with respect to each other, which causes an invalidation of the light absorbed at the shallower shallow, that is, the light within the range from the visible wavelength range to the near-infrared wavelength range. The first light receiving element further includes a photodiode formed at the deeper junction, that is, the N well-P diffusion layer junction, the photodiode receiving infrared light so as to generate a photoelectric current. Consequently, the first light receiving element as a whole can have a spectral-response characteristic for the infrared wavelength range.

The second light receiving element includes a photodiode formed at the shallower junction, that is, the P layer-N well junction, the photodiode receiving light within the range from the visible wavelength range to the near-infrared wavelength range so as to generate a photoelectric current. The second light receiving element further includes a photodiode formed at the deeper junction, that is, the N well-P diffusion layer junction, the photodiode receiving infrared light so as to generate a photoelectric current. Consequently, the second light receiving element as a whole has a spectral-response characteristic for the range from the visible wavelength range to the infrared wavelength range.

The illuminance sensor of the present invention may preferably be arranged such that the first light receiving element has a third layered structure including (i) a third N layer, (ii) a third P layer provided so as to enclose and form a junction with the third N layer, (iii) a third N well enclosing the third P layer, and (iv) a third P diffusion layer enclosing the third N well, the third layered structure further including (i) a photodiode formed at a junction between the third N layer and the third P layer, (ii) a photodiode formed at a junction between the third P layer and the third N well, and (iii) a photodiode formed at a junction between the third N well and the third P diffusion layer, the photodiode formed at the junction between the third N layer and the third P layer having an anode and a cathode which are short-circuited with respect to each other, the photodiode formed at the junction between the third P layer and the third N well having an anode and a cathode which are short-circuited with respect to each other; and the second light receiving element has a fourth layered structure identical to the third layered structure, the fourth layered structure including (i) a fourth N layer, (ii) a fourth P layer provided so as to enclose and form a junction with the fourth N layer, (iii) a fourth N well enclosing the fourth P layer, and (iv) a fourth P diffusion layer enclosing the fourth N well, the fourth layered structure further including (i) a photodiode formed at a junction between the fourth N layer and the fourth P layer, (ii) a photodiode formed at a junction between the fourth P layer and the fourth N well, and (iii) a photodiode formed at a junction between the fourth N well and the fourth P diffusion layer, the photodiode formed at the junction between the fourth N layer and the fourth P layer having an anode and a cathode which are short-circuited with respect to each other.

The above arrangement allows (i) the first light receiving element as a whole to have a spectral-response characteristic for the infrared wavelength range and (ii) the second light receiving element as a whole to have a spectral-response characteristic for the range from the visible wavelength range to the infrared wavelength range.

Further, the first light receiving element and the second light receiving element each include a photodiode at the shallower junction, that is, the N layer-P layer junction, the photodiode absorbing ultraviolet light. The photodiode has an anode and a cathode which are short-circuited with respect to each other, which causes an invalidation of the ultraviolet light absorbed at the shallower junction. Consequently, the first light receiving element and the second light receiving element can reduce a spectral-response characteristic for the ultraviolet range as a whole.

The display device of the present invention may preferably further include: a luminous body; and a control circuit, wherein: the luminous body is driven by the control circuit; the first light receiving element receives light emitted by the luminous body and then reflected by a detection object; the control circuit detects the first current, which flows through the first light receiving element in correspondence with the intensity of the light received by the first light receiving element, so as to detect whether the detection object is present; and the backlight control circuit controls the luminance of the backlight device on a basis of (i) a result of the detection of whether the detection object is present and (ii) a digital value of the third current, the digital value being outputted by the second analog-digital conversion circuit.

The above arrangement can adjust the luminance of the backlight device in correspondence with (i) whether a detection object (for example, a human face) is present and (ii) the intensity of environmental light, and can consequently reduce power consumption of the display device and improve visibility for the display device.

The display device of the present invention may preferably further include: a luminous body; and a control circuit, wherein: the luminous body is driven by the control circuit; the first light receiving element receives light emitted by the luminous body and then reflected by a detection object; the control circuit detects the first current, which flows through the first light receiving element in correspondence with the intensity of the light received by the first light receiving element, so as to measure a distance to the detection object; and the backlight control circuit controls the luminance of the backlight device on a basis of (i) a result of the measurement of the distance to the detection object and (ii) a digital value of the third current, the digital value being outputted by the second analog-digital conversion circuit.

The above arrangement can adjust the luminance of the backlight device in correspondence with (i) the distance to a detection object (for example, a human face) and (ii) the intensity of environmental light, and can consequently reduce power consumption of the display device and improve visibility for the display device.

INDUSTRIAL APPLICABILITY

The present invention allows the spectral-response characteristic of the illuminance sensor to approximate to the spectral luminous efficacy accurately, and is thus suitably applicable to a display device.

REFERENCE SIGNS LIST

10 liquid crystal panel
20 illuminance sensor
21 current output circuit
25 charging circuit
26 comparing circuit
27 control circuit (output circuit)
28 discharging circuit
30 backlight control circuit
40 backlight device
100 liquid crystal display device
ADC analog-digital conversion circuit (integrating analog-digital conversion circuit)

ADC1 analog-digital conversion circuit (first analog-digital conversion circuit; integrating analog-digital conversion circuit)
ADC2 analog-digital conversion circuit (second analog-digital conversion circuit; integrating analog-digital conversion circuit)
PD1 photodiode (first light receiving element)
PD2 photodiode (second light receiving element)
Count counter
Iin1 current (first current)
Iin2 current (second current)
Iin2−Iin1×α current (third current)
charge, charge1 bitstream signal
tconv charging period (analog-digital conversion period)
comp output signal (pulse signal)
C1 capacitor (integrating capacitor)
v1 reference voltage
vsig output voltage (of an integrating circuit)
α a coefficient
I1×α current (of a current output circuit)
I current (of a discharging circuit)

The invention claimed is:

1. An illuminance sensor including a first light receiving element and a second light receiving element which are different from each other in spectral-response characteristic,
the illuminance sensor comprising:
(A) a first analog-digital conversion circuit for carrying out an analog-digital conversion with respect to a first current which flows through the first light receiving element in correspondence with an intensity of light received by the first light receiving element, the first analog-digital conversion circuit including an integrating analog-digital conversion circuit which includes:
an integrating circuit that includes an integrating capacitor for integrating an electric charge corresponding to the first current inputted to the integrating circuit and that outputs a voltage corresponding to a result of the integration by the integrating capacitor;
a comparing circuit that compares (i) a magnitude of the voltage outputted by the integrating circuit with (ii) a magnitude of a reference voltage so as to output a result of the comparison as a binary pulse signal;
an output circuit for receiving the pulse signal outputted by the comparing circuit, the output circuit (i) including a counter for counting a number of active pulses included in the pulse signal received and (ii) outputting, as an analog-digital conversion value for the first current, a result of the count by the counter; and
a discharging circuit that receives from the output circuit a time series stream of the active pulses as a bitstream signal and that outputs a current during an active pulse period of the bitstream signal so as to discharge the integrating capacitor;
(B) a current output circuit for receiving the bitstream signal from the output circuit and outputting a current during the active pulse period of the bitstream signal; and
(C) a second analog-digital conversion circuit including an integrating analog-digital conversion circuit for carrying out an analog-digital conversion with respect to a third current obtained by subtracting the current outputted by the current output circuit from a second current which flows through the second light receiving element in correspondence with an intensity of light received by the second light receiving element.

2. The illuminance sensor according to claim 1, wherein:
the second analog-digital conversion circuit is identical in circuit configuration to the first analog-digital conversion circuit.

3. The illuminance sensor according to claim 1, wherein:
the first light receiving element has a spectral-response characteristic for an infrared wavelength range; and
the second light receiving element has a spectral-response characteristic for a range from a visible wavelength range to the infrared wavelength range.

4. The illuminance sensor according to claim 1, wherein:
no bias voltage is applied to the first light receiving element.

5. The illuminance sensor according to claim 1, wherein:
no bias voltage is applied to the second light receiving element.

6. The illuminance sensor according to claim 1, wherein:
the current outputted by the current output circuit has a mean value during an analog-digital conversion period for the second analog-digital conversion circuit which mean value is obtained by multiplying a value of the first current by a coefficient which is capable of being set variably.

7. The illuminance sensor according to claim 6, wherein:
the coefficient is set within a range from 1.1 to 1.2.

8. The illuminance sensor according to claim 7, wherein:
the coefficient is set to 1.15.

9. The illuminance sensor according to claim 1, wherein:
the first light receiving element and the second light receiving element are each provided with a filter for transmitting, toward a light receiving surface thereof, light within a green wavelength range and light within a infrared wavelength range.

10. The illuminance sensor according to claim 1, wherein:
the first light receiving element has a first layered structure including a first P layer, a first N well enclosing the first P layer, and a first P diffusion layer enclosing the first N well, the first layered structure further including (i) a photodiode formed at a junction between the first P layer and the first N well and (ii) a photodiode formed at a junction between the first N well and the first P diffusion layer, the photodiode formed at the junction between the first P layer and the first N well having an anode and a cathode which are short-circuited with respect to each other; and
the second light receiving element has a second layered structure identical to the first layered structure, the second layered structure including a second P layer, a second N well enclosing the second P layer, and a second P diffusion layer enclosing the second N well, the second layered structure further including (i) a photodiode formed at a junction between the second P layer and the second N well and (ii) a photodiode formed at a junction between the second N well and the second P diffusion layer.

11. The illuminance sensor according to claim 1, wherein:

the first light receiving element has a third layered structure including (i) a third N layer, (ii) a third P layer provided so as to enclose and form a junction with the third N layer, (iii) a third N well enclosing the third P layer, and (iv) a third P diffusion layer enclosing the third N well, the third layered structure further including (i) a photodiode formed at a junction between the third N layer and the third P layer, (ii) a photodiode formed at a junction between the third P layer and the third N well, and (iii) a photodiode formed at a junction between the third N well and the third P diffusion layer, the photodiode formed at the junction between the third N layer and the third P layer having an anode and a cathode which are short-circuited with respect to each other, the photodiode formed at the junction between the third P layer and the third N well having an anode and a cathode which are short-circuited with respect to each other; and the second light receiving element has a fourth layered structure identical to the third layered structure, the fourth layered structure including (i) a fourth N layer, (ii) a fourth P layer provided so as to enclose and form a junction with the fourth N layer, (iii) a fourth N well enclosing the fourth P layer, and (iv) a fourth P diffusion layer enclosing the fourth N well, the fourth layered structure further including (i) a photodiode formed at a junction between the fourth N layer and the fourth P layer, (ii) a photodiode formed at a junction between the fourth P layer and the fourth N well, and (iii) a photodiode formed at a junction between the fourth N well and the fourth P diffusion layer, the photodiode formed at the junction between the fourth N layer and the fourth P layer having an anode and a cathode which are short-circuited with respect to each other.

12. A display device, comprising:

a display panel for displaying an image;

a backlight device for irradiating the display panel;

a backlight control circuit for controlling luminance of the backlight device; and the illuminance sensor according to claim 1, the backlight control circuit controlling the luminance of the backlight device on a basis of a digital value outputted by the second analog-digital conversion circuit.

13. The display device according to claim 12, further comprising:

a luminous body; and a control circuit, wherein:

the luminous body is driven by the control circuit;

the first light receiving element receives light emitted by the luminous body and then reflected by a detection object;

the control circuit detects the first current, which flows through the first light receiving element in correspondence with the intensity of the light received by the first light receiving element, so as to detect whether the detection object is present; and the backlight control circuit controls the luminance of the backlight device on a basis of (i) a result of the detection of whether the detection object is present and (ii) a digital value of the third current, the digital value being outputted by the second analog-digital conversion circuit.

14. The display device according to claim 12, further comprising:

a luminous body; and a control circuit, wherein:

the luminous body is driven by the control circuit;

the first light receiving element receives light emitted by the luminous body and then reflected by a detection object;

the control circuit detects the first current, which flows through the first light receiving element in correspondence with the intensity of the light received by the first light receiving element, so as to measure a distance to the detection object; and the backlight control circuit controls the luminance of the backlight device on a basis of (i) a result of the measurement of the distance to the detection object and (ii) a digital value of the third current, the digital value being outputted by the second analog-digital conversion circuit.

* * * * *